US008639557B2

(12) United States Patent
Frangione et al.

(10) Patent No.: US 8,639,557 B2
(45) Date of Patent: Jan. 28, 2014

(54) METHOD AND SYSTEM FOR COLLECTING AND ANALYZING MARKET DATA IN A MOBILE COMMUNICATIONS SYSTEM

(75) Inventors: Tom Frangione, Novato, CA (US); Liam Mahoney, San Francisco, CA (US); Andreas Vogel, San Francisco, CA (US); Christopher Chin, San Carlos, CA (US); James Baer, San Francisco, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 2483 days.

(21) Appl. No.: 10/237,478

(22) Filed: Sep. 6, 2002

(65) Prior Publication Data
US 2003/0229534 A1 Dec. 11, 2003

Related U.S. Application Data

(60) Provisional application No. 60/388,060, filed on Jun. 11, 2002.

(51) Int. Cl.
G06Q 30/00 (2012.01)
H04Q 7/20 (2006.01)
H04W 4/00 (2009.01)

(52) U.S. Cl.
USPC .......... 705/7.29; 709/206; 709/219; 709/227; 379/9; 379/14; 379/7; 379/51; 379/90.1; 379/93.05; 379/133; 379/221.1; 455/422.1; 455/466

(58) Field of Classification Search
USPC ........ 705/7.29; 709/206, 219, 227; 379/9, 14, 379/7, 52, 90.1, 93.05, 133, 221.1; 455/422.1, 661
See application file for complete search history.

(56) References Cited

U.S. PATENT DOCUMENTS

| 5,661,792 | A | 8/1997 | Akinpelu et al. |
| 5,822,410 | A | 10/1998 | McCausland et al. |
| 5,903,625 | A | 5/1999 | May |
| 6,006,085 | A | 12/1999 | Balachandran |
| 6,028,914 | A | 2/2000 | Lin et al. |
| 6,049,599 | A | 4/2000 | McCausland et al. |
| 6,169,896 | B1 | 1/2001 | Sant et al. |

(Continued)

FOREIGN PATENT DOCUMENTS

| WO | 0056098 | 9/2000 |
| WO | 0219625 | 3/2002 |

OTHER PUBLICATIONS

Competitive Marketing Intelligence, Criterion Wireless, Oct. 23, 2001, obtained from bibalex.org, http://web.petabox.bibalex.org/web/20011023030727/ www.criterionwireless.com/marketing.asp.*

(Continued)

Primary Examiner — Justin M Pats
(74) Attorney, Agent, or Firm — Hanley, Flight & Zimmerman LLC

(57) ABSTRACT

A method and a system for measuring market data in a mobile communications system. The method and system may be used to obtain data such as growth, churn rate, and other measurable metrics of mobile communications device subscribers. The method includes selecting a sample of contact numbers, using one or more contacting or querying methodologies to assess the state of the contact numbers, and analyzing the results to determine the market data.

63 Claims, 22 Drawing Sheets

(56) References Cited

U.S. PATENT DOCUMENTS

| | | | |
|---|---|---|---|
| 6,192,115 B1 | 2/2001 | Toy et al. | |
| 6,301,471 B1 | 10/2001 | Dahm et al. | |
| 6,411,807 B1 | 6/2002 | Amin et al. | |
| 6,487,390 B1 | 11/2002 | Virine et al. | |
| 6,493,558 B1 * | 12/2002 | Bernhart et al. | 455/466 |
| 6,556,992 B1 | 4/2003 | Barney | |
| 6,597,903 B1 | 7/2003 | Dahm et al. | |
| 6,618,587 B1 | 9/2003 | Ghafoor | |
| 6,625,269 B1 | 9/2003 | Kim | |
| 6,751,295 B2 | 6/2004 | McCulley et al. | |
| 6,754,470 B2 * | 6/2004 | Hendrickson et al. | 455/67.11 |
| 6,788,926 B1 | 9/2004 | Frangione et al. | |
| 6,832,211 B1 | 12/2004 | Thomas et al. | |
| 7,003,306 B2 | 2/2006 | Henry-Labordere | |
| 7,058,412 B2 | 6/2006 | Lowe et al. | |
| 7,139,246 B2 | 11/2006 | Harris et al. | |
| 7,190,969 B1 | 3/2007 | Oh et al. | |
| 7,243,127 B2 * | 7/2007 | Tabayoyon et al. | 709/206 |
| 7,248,862 B2 | 7/2007 | Minborg et al. | |
| 7,366,515 B2 | 4/2008 | Zhao et al. | |
| 7,369,865 B2 | 5/2008 | Gabriel et al. | |
| 7,599,681 B2 | 10/2009 | Link, II et al. | |
| 7,761,088 B1 | 7/2010 | Hannan et al. | |
| 7,933,392 B1 | 4/2011 | Hannan et al. | |
| 8,279,852 B2 | 10/2012 | Lu et al. | |
| 8,369,826 B2 | 2/2013 | Alla | |
| 8,433,047 B2 | 4/2013 | Hannan et al. | |
| 2002/0023003 A1 | 2/2002 | Raheman | |
| 2002/0069037 A1 | 6/2002 | Hendrickson et al. | |
| 2003/0013439 A1 * | 1/2003 | Daniel et al. | 455/422 |
| 2003/0023571 A1 | 1/2003 | Barnhill | |
| 2003/0061152 A1 | 3/2003 | De | |
| 2003/0064722 A1 | 4/2003 | Frangione et al. | |
| 2003/0088491 A1 | 5/2003 | Liu et al. | |
| 2003/0190015 A1 * | 10/2003 | McCulley et al. | 379/9 |
| 2003/0200135 A1 | 10/2003 | Wright | |
| 2003/0229534 A1 | 12/2003 | Frangione et al. | |
| 2003/0236694 A1 | 12/2003 | Liu et al. | |
| 2004/0097245 A1 | 5/2004 | Sheth et al. | |
| 2005/0043011 A1 | 2/2005 | Murray et al. | |
| 2005/0271029 A1 | 12/2005 | Iffland | |
| 2006/0109846 A1 | 5/2006 | Lioy et al. | |
| 2006/0135161 A1 | 6/2006 | Jiang et al. | |
| 2007/0099635 A1 | 5/2007 | Mohanty et al. | |
| 2007/0156673 A1 | 7/2007 | Maga et al. | |
| 2007/0165613 A1 | 7/2007 | Soo et al. | |
| 2007/0185867 A1 | 8/2007 | Maga et al. | |
| 2008/0182553 A1 | 7/2008 | Salkini et al. | |
| 2008/0228557 A1 | 9/2008 | Sepehri-Nik et al. | |
| 2010/0080369 A1 | 4/2010 | Hurst et al. | |
| 2010/0167689 A1 | 7/2010 | Sepehri-Nik et al. | |
| 2013/0064242 A1 | 3/2013 | Lu et al. | |

OTHER PUBLICATIONS

Telephia acquires Mspect, Adding SMS Monitoring to Its Wireless Data QoS Solution, Business Wire, Nov. 13, 2001, p. 0226.*
Patent Assignment Abstract of Title, U.S. Appl. No. 10/263,782.*
Handling SMS in BREW, Qualcomm.com, Feb. 9, 2002, retrieved from web.archive.org, p. 1-3.*
Vougioukas and Manos Rouincliotis, A System for Basic-Level Network Fault Management Based on the GSM Short Message Service (SMS), Proceedings of EUROCON'2001 International Conference on Trends in Communications vol. 1, 2001, p. 218-222.*
Palm, SMS Handbook, 2001, p. 1-24.*
Office Action for U.S. Appl. No. 11/486,498, issued on Apr. 3, 2009, 8 pages.
Office Action for U.S. Appl. No. 11/527,219, issued on Dec. 15, 2008, 8 pages.
Office Action for U.S. Appl. No. 10/263,782, issued on May 21, 2003, 10 pages.
EP Office Action issued for EP application 03719560.9, issued on Oct. 8, 2008, 3 pages.
CN Office Action issued for CN 03812238.3, issued on Jan. 18, 2008, 11 pages.
CA Office Action issued for CA application 2,481,203, issued on Dec. 4, 2007, 3 pages.
JP Office Action issued for JP application P2003-583001, issued on Sep. 30, 2008, 4 pages.
CN Office Action issued for CN application 01816436.6, issued Dec. 9, 2005, 6 pages.
Vougioukas and Manos Rouincliotis, System for Basic Level Network Fault Mgmt based on the GSM Short Message Service (SMS), Proceedings of EURON'2001 International Conference on Trends in Communications vol. 1, 2001, 1 page.
Telephia acquires Mspect, Adding SMS Monitoring to Its Wireless Data QoS Solution, Business Wire, Nov. 13, 2001, 2 pages.
Galaxy Phones, Mobile Phones—The Basics, internet article, www.galaxyphones.co.uk/mobile_phones_basics07.asp, Mar. 2, 2006, 4 pages.
Call Delivery, internet article, www.members.tripod.com, retrieved from internet on Feb. 1, 2006, 1 page.
NPA-NXX, North American Numbering Plan, internet article, voip-info.org, retrieved from internet on May 12, 2008, 3 pages.
Wikipedia, Network Switching Subsystem, internet article, retrieved from the internet on Mar. 2, 2006, 6 pages.
International Bureau, International Search Report for PCT/US03/18070, Aug. 29, 2003, 5 pages.
United States Patent and Trademark Office, Office Action issued for U.S. Appl. No. 11/527,219, mailed on Jun. 24, 2009, 20 pages.
United States Patent and Trademark Office, "Non-Final Office Action" issued in connection with U.S. Appl. No. 11/445,069, mailed May 10, 2010, 38 pages.
United States Patent and Trademark Office, "Notice of Allowance," issued in connection with U.S. Appl. No. 11/445,069, mailed Oct. 19, 2010, 15 pages.
United States Patent and Trademark Office, "Notice of Allowance," issued in connection with U.S. Appl. No. 11/445,069, mailed Dec. 7, 2010, 42 pages.
United States Patent and Trademark Office, "Notice of Allowance," issued in connection with U.S. Appl. No. 11/445,069, mailed Mar. 30, 2011, 4 pages.
United States Patent and Trademark Office, "Non-Final Office Action", issued in connection with U.S. Appl. No. 12/911,044, mailed Aug. 17, 2012, 25 pages.
United States Patent and Trademark Office, "Notice of Allowance," issued in connection with U.S. Appl. No. 12/911,044, mailed Jan. 8, 2013, 29 pages.
United States Patent and Trademark Office, "Non-Final Office Action", issued in connection with U.S. Appl. No. 12/243,633, mailed Dec. 6, 2011, 12 pages.
United States Patent and Trademark Office, "Notice of Allowance," issued in connection with U.S. Appl. No. 12/243,633, mailed May 29, 2012, 14 pages.
European Patent Office, "Extended European Search Report," issued in connection with application No. EP 09012467.8, mailed Mar. 23, 2010, 7 pages.
United States Patent and Trademark Office, "Non-Final Office Action", issued in connection with U.S. Appl. No. 12/243,699, mailed Nov. 23, 2012, 59 pages.
European Patent Office, "Extended European Search Report," issued in connection with application No. EP 09012468.6, mailed Jan. 26, 2010, 6 pages.
United States Patent and Trademark Office, "Non-Final Office Action," issued in connection with U.S. Appl. No. 12/406,538, mailed Sep. 12, 2011, 26 pages.
United States Patent and Trademark Office, "Final Office Action," issued in connection with U.S. Appl. No. 12/406,538, mailed Jun. 19, 2012, 19 pages.
United States Patent and Trademark Office, "Notice of Allowance," issued in connection with U.S. Appl. No. 12/406,538, mailed Oct. 3, 2012, 17 pages.
State Intellectual Property Office of the People'S Republic of China, "Notification to Grant Patent Right for Invention," issued in connection with application No. CN 03812238.3, on Mar. 24, 2010, 2 pages.

(56) References Cited

OTHER PUBLICATIONS

State Intellectual Property Office of the People'S Republic of China, "First Office Action," issued in connection with application No. CN 2010102069592, on Dec. 16, 2011, 11 pages.

State Intellectual Property Office of the People'S Republic of China, "Second Office Action," issued in connection with application No. CN 2010102069591, on Dec. 4, 2012, 10 pages.

Canadian Intellectual Property Office, "Notice of Allowance," issued in connection with application No. CA 2,481,203, on Jun. 5, 2009, 1 page.

European Patent Office, "Communication Pursuant to Article 94(3) EPC," issued in connection with application No. EP 03719560.9, on Sep. 8, 2010, 6 pages.

Korean Intellectual Property Office, translation of "Non-Final Rejection," issued in connection with application No. KR 10-2004-7015715, on Nov. 10, 2009, 8 pages.

Korean Intellectual Property Office, "Final Rejection with English translation," issued in connection with application No. KR 10-2004-7015715, on Apr. 12, 2010, 6 pages.

United States Patent and Trademark Office, "Final Office Action," issued in connection with U.S. Appl. No. 11/486,498, on Nov. 4, 2009, 25 pages.

U.S. Appl. No. 11/527,219, "Method and System for Analyzing Wireless Markets," filed on Sep. 25, 2006, 45 pages.

U.S. Appl. No. 13/757,255, "Methods and Apparatus to Identify Wireless Subscriber Activity Status," filed on Feb. 1, 2013, 34 pages.

* cited by examiner

METHOD AND SYSTEM FOR COLLECTING AND ANALYZING MARKET DATA IN A MOBILE COMMUNICATIONS SYSTEM

CROSS-REFERENCE TO RELATED APPLICATIONS

This application claims priority of U.S. Provisional Patent Application No. 60/388,060 filed on Jun. 11, 2002, which is fully and completely incorporated herein by reference.

FIELD OF THE INVENTION

The present invention generally relates to mobile communications systems, and more particularly, to a method and system for collecting and analyzing market data in mobile communications systems. The method and system can be used to determine total subscribers, market share, subscriber growth, subscriber churn, and other measurable metrics of a mobile communications system for each mobile operator in a market by use of contact and querying methodologies, leveraging messaging systems, network signaling systems, and other methods, both non-intrusive and intrusive to a subscriber.

BACKGROUND OF THE INVENTION

Mobile operators often obtain and compile market information regarding subscribers of mobile communications systems, such as mobile telephone systems. Particularly, mobile operators often collect and analyze data regarding market share, growth, churn, and other measurable metrics relating to their respective subscribers, their position in a competitive market, and the dynamics of their competitive positions over time.

The present invention provides an improved method and system for collecting and analyzing these types of data in a mobile communications system.

SUMMARY OF THE INVENTION

The present invention provides a method and system for collecting and analyzing market data in a mobile communications system. The method and system may use one or more of various contact methodologies to contact a selected panel of Mobile Directory Numbers (MDNs). Based upon the contact response, the method and system will determine assignment or non-assignment of the MDN, which allows for analysis to determine various market metrics, such as market share, growths, churn, and the like.

One non-limiting advantage of the present invention is that it provides unique contact or querying methodologies. "Contact" methods use the subscriber services and inter-carrier services and signaling provided by a network to initiate an interaction with a Mobile Directory Number (MDN) or other unique subscriber identifiers (hereinafter collectively referred to as MDN) to determine if the MDN is currently assigned or unassigned. "Query" methods use a query to an external data source or to a data source internal to the carrier network to identify assignment or non-assignment. The terms "contact" and "query" will be used interchangeably in this context, and will be primarily referred to as "contact" methods going forward. Unless otherwise indicated, the term "contact" should be construed to cover both contact methods and querying methods. Contact can be made in such a way that the subscriber is not aware of the contact and does not receive a bill for the contact. Under some scenarios, contact can also be made in a way that the subscriber is aware of the contact and is billed or not. This usually applies to a scenario with subscriber acceptance of this contact in advance. There may be several contact implementation variants, such as:

1) Initiating a service request that attempts to directly contact the MDN to the point where the network confirms the assignment of the MDN, but then terminates the operation prior to the completion of the actual connection. The subscriber of an assigned MDN may or may not be aware of the contact and may or may not receive a bill for the contact.
2) Sending a message to an MDN in such a way or with such contents or heading information that the message is not visible on the mobile communications device of the subscriber of an assigned MDN, and is not billed to the subscriber of the assigned MDN.
3) Accurately assessing the state of an MDN through these or other methods in which the subscriber may or may not be aware of the contact and may or may not receive a bill for the contact.

Specific examples of contact methodologies are enumerated in this document. For example, the contact may be achieved through messaging, network signaling, or call set-up approaches, or additional non-intrusive and intrusive methods through a fixed or mobile communications system, or an external data source. The method of determining if an MDN is assigned or unassigned may also be made with one or more of the above-mentioned approaches in series or in parallel. The method of determining if an MDN is assigned or unassigned may require filtering specific MDNs before or after contact using internal or external sources of information. These sources of information may be derived from one or more of the above-mentioned contact method approaches in series or parallel.

Another non-limiting advantage of this invention is that it provides methods for sample selection and ongoing management. In general, sample selection is designed to achieve a "panel" or group of MDNs that will be contacted to test assignment or non-assignment. Several methods of sample selection may be employed within the present invention. In each method, the size and composition of the sample may be chosen to achieve desired or specified accuracy levels. Some examples of sample selection methods may include, but are not limited to: random panels, voluntary ("opt-in") panels, and periodic random sampling.

Another non-limiting advantage of the present invention is that it provides for the identification of a mobile operator or geographic origin of an MDN. The method of identification may differ based upon the manner in which the MDN is allocated to a mobile operator. An MDN may be assigned to a carrier by one of several means:

1) Currently, there is a third party that allocates MDNs (currently referred to as Mobile Identification Numbers or MINs) to each wireless carrier in the United States in blocks of 10,000. With number pooling, block size will decrease to 1,000 in some cases. It is currently possible to compare an MDN to this database to allocate it to a mobile operator, either before or after determining if the MDN is assigned or unassigned.
2) Internationally, and eventually in the US, an MDN is not "owned" by the mobile operator—an individual subscriber can decide to switch his service to a different mobile operator but still utilize the same MDN, often referred to as number portability. In this case, it may not be possible to compare an MDN to a third party database to allocate it to a specific mobile operator. However, it is possible, by assessing the format of the response received from the contacts within this system and method, to allocate the MDN to a specific mobile operator. This may be accomplished by creating and/or referencing a database that will track known response types or formats of each different mobile operator to each different contact method. The response type may vary across mobile operators, within a mobile operator's territory across geographies, and over time as a mobile operator updates portions of their network.

According to one aspect of the present invention, a method for collecting and analyzing market data in a mobile communications system is provided. The method includes the steps of selecting a representative sample of MDNs; contacting the sample of MDNs to obtain contact results, including an assigned or unassigned state for each of the MDNs; and analyzing the contact results to determine a measure of market data.

These and other features and advantages of the invention will become apparent by reference to the following drawings and detailed description.

DETAILED DESCRIPTION OF THE EMBODIMENTS

The present invention will now be described in detail with reference to the drawings, which are provided as illustrative examples of the invention so as to enable those skilled in the art to practice the invention. The present invention may be implemented using software, hardware, and/or firmware or any combination thereof, which may be coupled to and/or incorporated within one or more components of a mobile communications and/or fixed network, as would be apparent to those of ordinary skill in the art. The preferred embodiment of the present invention will be described herein with reference to an exemplary implementation of a mobile and fixed communications network. However, the present invention is not limited to this exemplary implementation, but can be practiced in any mobile and/or fixed communications network.

The discussion below describes the present invention in the following manner: (i) Section I describes a general method for gathering and analyzing data in a mobile communications system, according to one embodiment of the present invention; (ii) Section II describes some exemplary system architectures that may be used to gather and analyze data in a mobile communications system; and (iii) Section III describes methods that may be employed by the systems set forth in Section II to make contacts over a fixed or mobile communications system.

I. General Method

Figure 1:
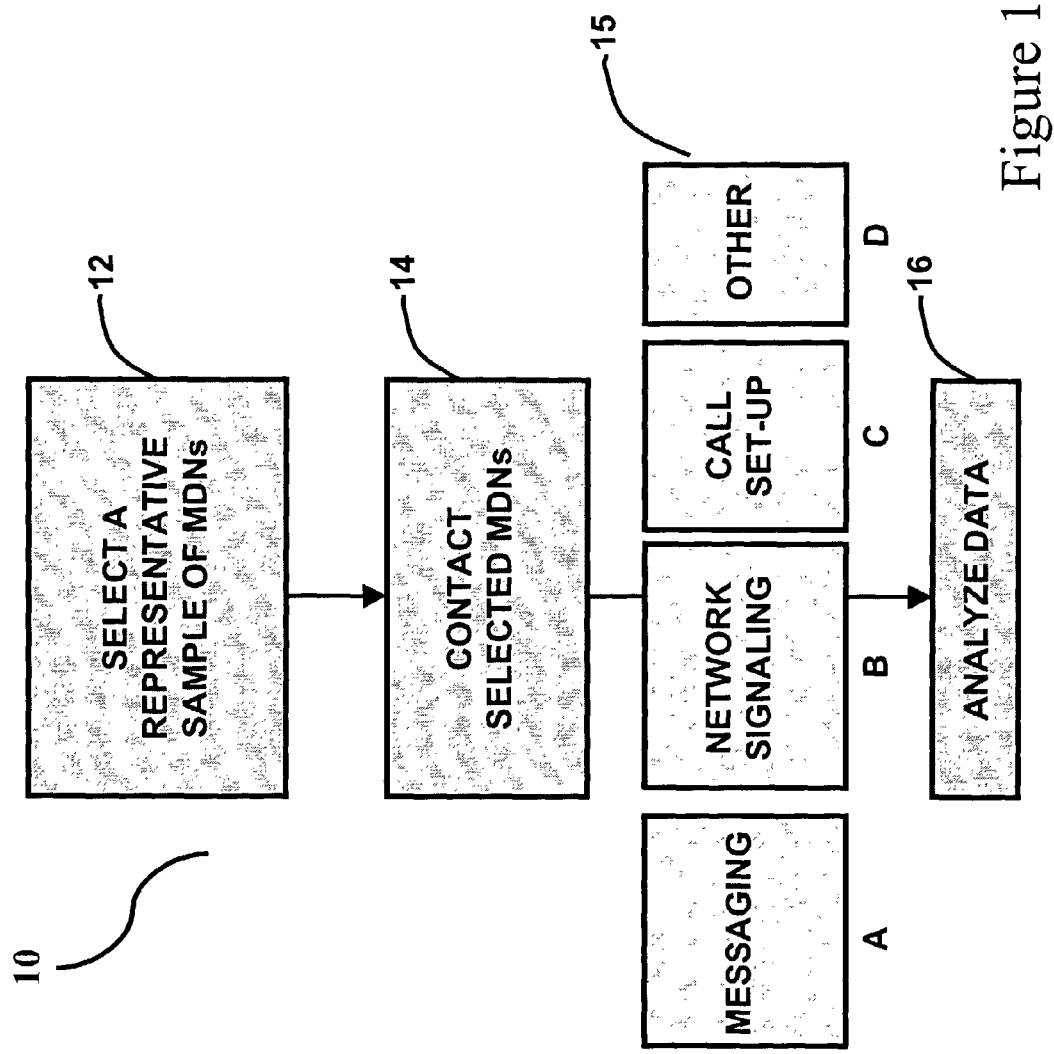
FIG. 1 is a block diagram illustrating a general method of collecting and analyzing market data in a mobile communications system, according to one embodiment of the present invention.

The present invention may be used to collect and analyze data of various (e.g., competitive) mobile operators in different markets. FIG. 1 illustrates one embodiment of a general method 10 for collecting and analyzing market data in a mobile communications system. The method contacts, through a Contact-based Data Gathering System (DGS), a selected sample of numbers and analyzes the results to determine various market metrics. In a preferred embodiment, the method may include the following steps:

a) Sample Selection: The method begins by selecting a representative sample of contact MDNs across each of the mobile operators and each of the markets to be analyzed, as shown in step 12.

b) Contact: Next, the DGS contacts the selected MDNs, as shown in step 14. If the result of the contact attempt is inconclusive, the DGS may reattempt to make contact one or more times. As shown by blocks 15A-15D, contact can be made using various methods, such as messaging 15A, network signaling 15B, call set-up 15C, and other methods 15D.

c) Analysis: In step 16, the DGS processes the gathered data in order to determine market measures including, but not limited to, market share data, growth, churn, and the like.

Each of these steps is described below in greater detail.

a) Sample Selection

Several methods of sample selection may be employed within the present invention. In each method, the size and composition of the sample may be chosen to achieve desired or specified accuracy criteria. For accurate inference, the sample must represent the underlying population, in this case the set of all MDNs allocated to a mobile operator in a particular market. The sample is meant to be representative of the population of numbers rather than users, hence at any given time, the sample includes numbers that are allocated to the carrier, but unassigned to any subscriber.

Some examples of sample selection methods may include, but are not limited to, the following:

1. Random Panel: In this method, a random sample may be drawn from among the possible Mobile Directory Numbers (MDNs) allocated to a mobile operator within one or more pre-defined markets. This pool of numbers or "panel" may be tracked going forward using any number or combination of Contact methods, as described below. The panel may require occasional revision to accommodate the additional allocation of new MDN blocks, number pooling, wireless number portability, and other changed conditions.

2. Voluntary (Opt-in) Panel: In this method, panel participants (e.g., current and potential mobile subscribers on a system) may be solicited and would explicitly agree to participate. This panel may also be tracked over time with any number or combination of Contact methods and may be managed in a similar manner to accommodate dropouts, and other changed conditions.

3. Periodic Random Sampling: Under the Periodic Random Sampling approach, a new random sample of MDNs may be drawn for each new period of time, which may be any suitable predetermined time period (e.g., 1 month). The new random sample may be drawn from a pool of possible MDNs, which may be determined by MDN blocks allocated to a mobile operator within one or more specific pre-defined markets.

Mobile operators are allocated new number blocks over time to accommodate growth in their subscriber base. As operators add new blocks, the panels used in the method must be periodically adjusted to incorporate the new blocks. When new blocks are added, the method requires use of one of the following methods (or a similar method) for incorporating the new blocks.

1. Simple Expansion: In this method, as soon as new allocated blocks are identified, or achieve a target "fill rate" (i.e., the proportion of assigned MDNs found in the sample) that is significant, the panel is expanded to include a random draw from the new blocks. The quantity of new numbers added to the panel should be based on the desired inference and guided by standard statistical accuracy tradeoffs.

2. Redraw and Reblend: In this method, when new blocks are allocated to mobile operators a new sample is drawn. The panel from the previous period is maintained initially, and then phased out over multiple periods. This is a change in the composition of the panel but not an increase in the size going forward, as distinct from the "Simple Expansion" method outlined above. "Blending" is achieved by using weighted averages of the results, with the weight shifting gradually toward the new panel.

3. Partial Draw with Retirement. In this method, when new blocks are allocated to mobile operators, a certain portion of the panel from the previous period is retired, and a new sample is substituted in place, rather than drawing an entirely new panel as described in "Redraw and Reblend." The numbers to be retired and the new draw are selected in accordance to the same criteria used to create the original sample. The proportion of the panel to be replaced and the frequency of replacement can be adjusted to control how long it takes before new blocks are represented in the sample.

Figure 1A:
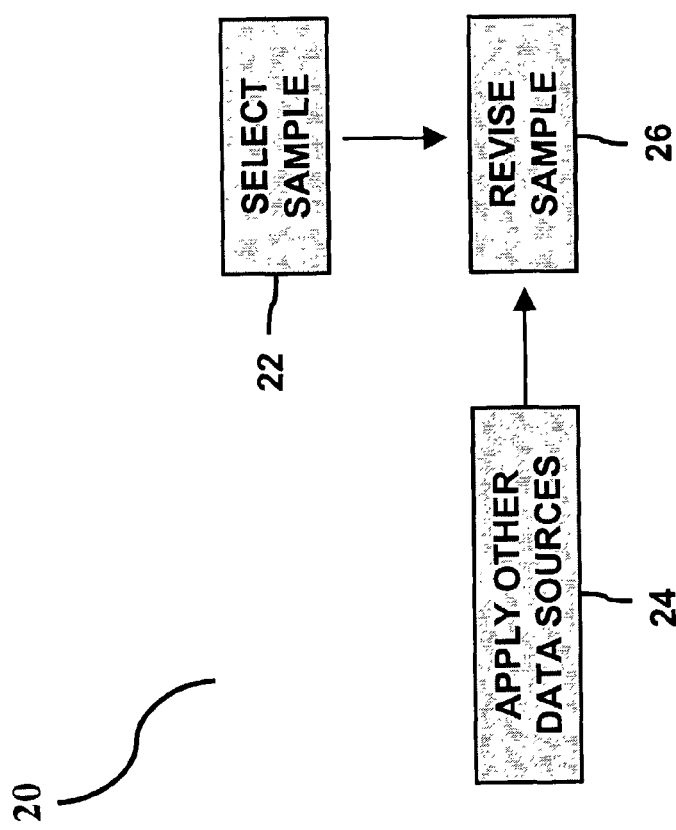
FIG. 1A is a block diagram illustrating one embodiment of a sample selection process, which may involve the use of one or more data sources to segment, filter, subset, refine, or otherwise alter the sample of MDNs to be contacted.

FIG. 1A illustrates a block diagram 20 of a sample selection process, which may involve the use of one or more data sources to segment, filter, subset, refine, or otherwise alter the sample of MDNs to be contacted. The data sources 24 may be applied to the initial sample selected 22 to arrive at a revised sample 26 used for the contact step. For this process, the sample of MDNs may be drawn from the output of one of the aforementioned sample selection methods and iteratively filtered or revised using one or more data sources.

One embodiment of the sample selection process described uses data from the Data Gathering Node (DGN) as referred to in U.S. patent application Ser. No. 09/271,105, entitled "System and Method for Gathering Data from Wireless Communications Networks," which is assigned to the present assignee, and which is fully and completely incorporated herein by reference. The DGS can use data sourced from the DGN to filter MDNs from the sample based on the criteria that is specified. Other data sources include, but are not limited to, internal databases, external or third party databases, public sources of information, and other such data sources.

"Internal" databases may include, but are not limited to, databases generated through the DGNs, databases generated as a result of individual customer surveys (e.g., through the Wireless Phone User Survey, which is provided by Telephia, Inc., of San Francisco, Calif.) and databases generated to provide point of sale and distribution information.

"External databases" may include, but are not limited to, databases of MDNs generated for other business purposes and queried by this method for information on assignment or non-assignment, carrier allocation, and the like. Such databases could include those necessary by U.S. mobile operators and their vendors for effective management of wireless number pooling, wireless number portability, inter-carrier messaging and/or e911, among others.

b) Contact

This section generally describes the contact step (e.g., step 14 in FIG. 1) performed within the present invention. The contact step may be performed using one or more methodologies as described below to contact or query a sample of MDNs to determine assigned or unassigned status. This contact process may involve the use of one or more distinct contact methods in series or parallel to arrive at a particular conclusion.

In a preferred embodiment, over a certain period of time (e.g., one day, one week, one month, one quarter), each of the MDNs identified in the sample set is contacted at least once to assess assignment or non-assignment. As will be appreciated by those skilled in the art, in a conventional fixed or mobile network that is configured to reply with multiple response types, or in accessing specific subscriber data sets, the contact may return a plurality of different results.

Depending on the result received, the DGS may conclude the following:
1. MDN is an assigned subscriber (e.g., if contact is received by the addressed mobile communications device, or if the query generates a positive result).
2. MDN is unassigned (e.g., if an invalid phone number is indicated, or if a number or address has not been allocated to a particular subscriber).
3. All of the other results may be inconclusive with respect to this method. Furthermore, other types of error messages may be generated and received for indeterminable reasons.

Under this scenario, when a result of type 3 is received, the DGS may flag the MDN for retry. All of the flagged MDNs may be retried using one or more forms of contacts or queries, either over a predetermined period of time, for a predetermined number of times, or both. The DGS may either eventually receive an assignment confirmation, or may assume based on the retry pattern that the number or address is assigned or unassigned.

c) Analysis

Based on the results of the return receipts, a number of different analytical methods may be used to calculate market measures, such as market share data, growth, churn, and the like. The statistical techniques used for analysis may vary based on the sample selection method. Some of the analysis methods that may be used include, but are not limited to, the following:
1. Random Panel: For a randomly selected panel of MDNs, the total number of subscribers may be estimated based on the proportion of the assigned users found in the sample—the "fill rate"—scaled to the overall population. Statistical models may be used to infer operator and market level subscribers, market share, gross additions ("activations") of subscribers, deactivations, churn rate of subscribers (deactivations divided by previous period subscribers), and net activations of subscribers (change in total subscribers from one period to the next, net of gross additions and deactivations) for predetermined periods of time, based on the consistency of responses as the panel is tracked. This approach will provide unbiased estimators of the measures supported.
2. Voluntary (Opt-in) Panel: Deactivations can be estimated, based on the number of participants who drop service. In addition, subscriber "switching" behavior can be tracked. This estimator may be biased due to the inherent bias of a voluntary panel.
3. Periodic Random Sampling: For periodic random sampling, a new random sample may be drawn each period from a pool of possible MDNs. Total subscribers and market share may be estimated in the same manner as with a Random Panel, relying on the sample fill-rate scaled to the population. "Net activations" can be estimated as the difference between the total subscriber numbers from time period to time period. This approach will provide unbiased estimators of the measures supported, but may have additional sources of variance from sampling error due to the repeated selection of new samples.

The analysis step is performed using statistical models. These models take sample responses to determine the average "fill rate" across the blocks allocated to a mobile operator. This rate represents the percent of all allocated numbers that a mobile operator has assigned to a subscriber. By calculating an average "fill rate" across all allocated blocks, and multiplying by the number of blocks, one can determine the total number of MDNs a mobile operator has assigned to subscribers. Tracking this change in fill rate over time enables one to determine the net change in subscribers from month to month. Tracking changes in individual "panelist" responses enables one to determine the gross additions and deactivations from period to period. Individual "panelist" responses are defined as the determination of assignment or non-assignment of particular MDNs (vs. the overall average population). Gross additions and deactivations may be determined in the following manner:
1. An individual panelist response that was assigned in the previous period and assigned in the current period is considered in the total mobile operator subscriber number, but not a gross addition or a deactivation.
2. An individual panelist response that was assigned in the previous period and unassigned in the current period is considered a "deactivation" for the period.
3. An individual panelist response that was unassigned in the previous period and assigned in the current period is considered a "gross addition" for the period.
4. An individual panelist response that was unassigned in the previous period and unassigned in the current period is considered unassigned, and does not directly influence subscribers, gross additions, or deactivations.

Sample responses are then weighted as appropriate to reflect the total population of MDNs.

Figure 1B:
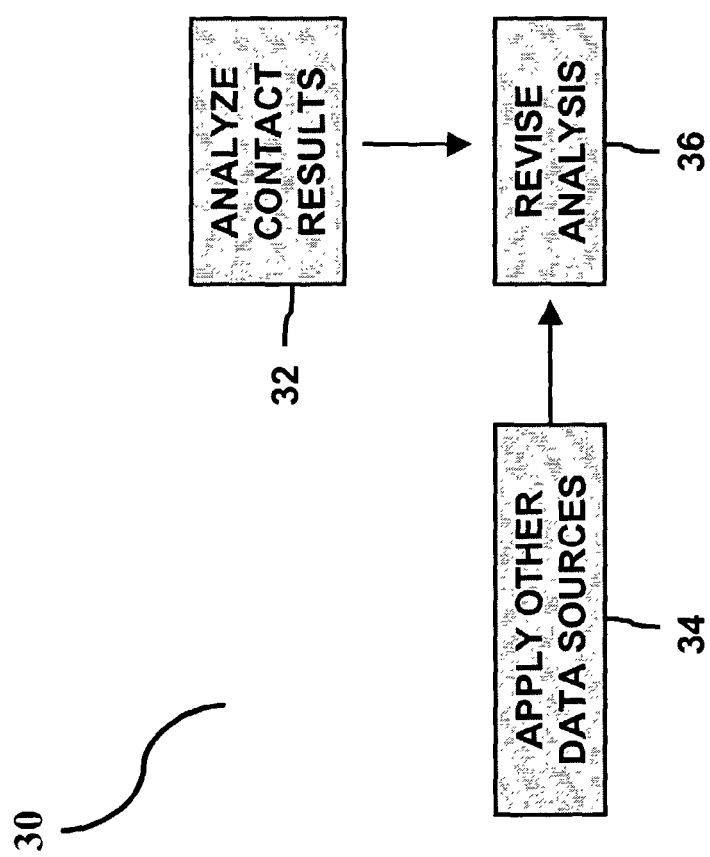
FIG. 1B is a block diagram illustrating one embodiment of an analysis step, which may involve the use of one or more data sources to segment, filter, subset, refine, or otherwise affect the analysis of the Contact results.

The analysis step may involve the use of one or more data sources to segment, filter, subset, refine, or otherwise effect the analysis of the Contact results as shown in diagram 30 of FIG. 1B. The data sources 34 may be applied to the initial analysis of the Contact results 32 to arrive at the revised analysis of Contact results 36. For this process, the analysis of the Contact results may be drawn from the output of one of the aforementioned analysis methods and iteratively revised using one or more data sources.

The analysis may also employ the use of one or more contact methods to arrive at an assigned or unassigned status conclusion for a particular MDN allocated to a specific carrier within a specific geographical market. Particularly, this may be accomplished as follows for domestic and international MDNs:
1) Currently, for Domestic MDNs: Allocation may be accomplished by using the database of a third party that assigns MDNs (currently referred to as Mobile Identification Numbers or MINs) to each wireless carrier in the United States. Particularly, an MDN may be compared to this database to allocate it to a mobile operator, either before or after determining if the MDN is assigned or unassigned.
2) For International MDNs (also may be used with Domestic MDNs): allocation may be accomplished by assessing the format of the response received from the contacts within the system and method, in order to allocate the MDN to a specific mobile operator. This may be accomplished by creating and/or referencing a database that will track known response types or formats of each different mobile operator to each different contact method. The response type may vary across mobile operators, within a mobile operator's territory across geographies, and over time as a mobile operator updates portions of its network.

The analysis may also use the results from one or more of the contact methods to triangulate or determine the status of a particular MDN as being assigned or unassigned. The unique contact method or combination of contact methods may vary substantially by carrier, by market, by some combination of carrier and market, or by some other factor. It is possible, by assessing the format of the response received from the contacts within this system and method, to allocate the MDN to a specific status of being assigned or unassigned. In one embodiment, the analysis step also identifies the geographical region of origin of the MDN. This may be accomplished by creating and/or referencing a database that will track known response types or formats of each different mobile operator in each different geographical market to each different contact method. Among other factors, the response type may vary across mobile operators, within a mobile operator's territory across geographies, and over time as a mobile operator updates portions of its network.

II. System Architecture

Figure 2:
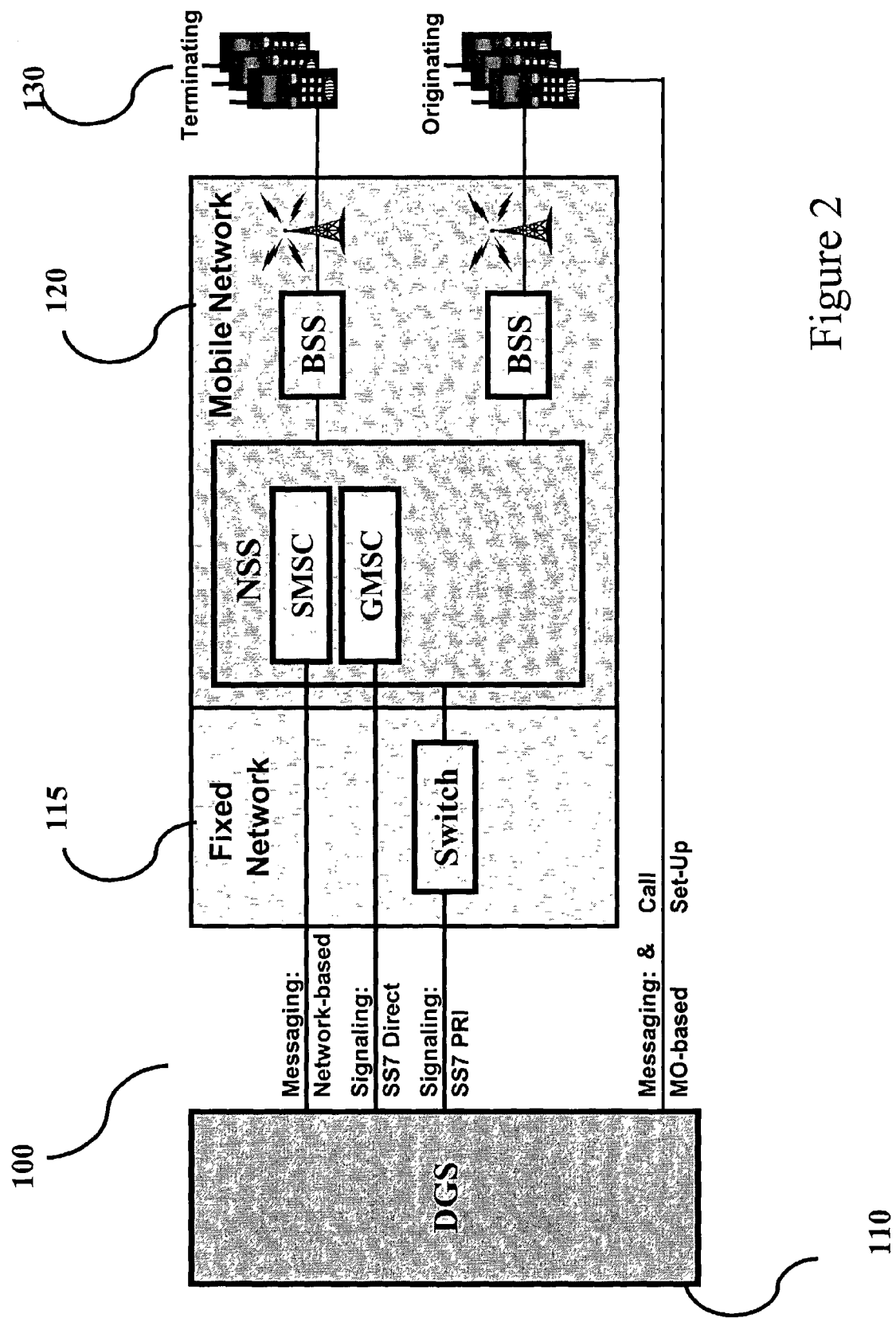
FIG. 2 is a schematic diagram of a system for collecting and analyzing market data in a mobile communications system.

FIG. 2 illustrates an exemplary system 100 that is adapted to gather and analyze market data in a mobile communications system, according to the described embodiments of the present invention. Where certain elements of the present invention can be partially or fully implemented using known components, only those portions of such known components that are necessary for an understanding of the present invention will be described. Detailed descriptions of other portions of such known components will be omitted so as not to obscure the invention, which is dependent on the external messaging, signaling and air interfaces rather than the internal operation of the mobile network. Furthermore, while the embodiments described herein are in reference to messaging, network signaling and call set-up systems, the present invention is not limited to these exemplary contact embodiments, but can be practiced with any type of suitable contact or query mechanisms.

The system 100 may have four components, including a Data Gathering System (DGS) 110, a fixed network 115, a mobile network 120, and a plurality of mobile communications devices 130. The DGS 110 may include one or more conventional hardware components, such as servers or computer systems, and one or more software components, which direct the operation of DGS 110, and which are adapted to perform the various functions and methods set forth below in Section III. The fixed network 115 may comprise any conventional fixed communication network, which may include switches and other fixed network elements and the like, that provides for communication between DGS 110 and a mobile network 120. The mobile network 120 may comprise any conventional mobile communication network, which may include Network and Switching Subsystems (NSSs), Base Station Sub-systems (BSSs), Gateway Mobile Switching Centers (GMSCs), Short Messaging Service Centers (SMSCs), other mobile network elements and the like, that provides for communication between fixed network 115 and devices 130. The mobile communication devices 130 may be any conventional mobile communication devices, such as mobile telephones, 2-way pagers, Personal Digital Assistants (PDAs), and the like.

The DGS 110 makes contacts or queries to assess the state of an MDN. In the process of making these attempts, the DGS 110 may use one or more fixed and/or mobile networks, such as networks 115 and 120. For each attempt, an acknowledgement is returned to the DGS 110 that may definitively determine the state of an MDN or not. If the state is not definitively determined, a re-contact or re-query attempt with the same or an alternate methodology will be made.

The subscriber contacts and queries can be submitted to fixed network 115 and/or mobile network 120 in at least three manners. Exemplary configurations for systems using these approaches are described below, in subsections A, B, and C.

One possibility (A) is to use messaging traffic to contact an MDN to determine if it is assigned or unassigned. Messaging traffic can be submitted to the network using a network-based approach, such as Short Message Point to Point Protocol (SMPP), a mobile-originated (MO) approach, or any other messaging approach as systems developed from voicemail (VM), Short Message Service (SMS) and Wireless Application Protocol (WAP) to Multimedia Message Service (MMS) and Instant Messaging (IM).

A second possibility (B) is to use network signaling to query an MDN to determine if it is assigned or unassigned. Signaling queries can be submitted to the network using an SS7 direct connection or an indirect connection (e.g., using an SS7 Primary Rate Interface (PRI) connection), or any other signaling approach.

A third possibility (C) is to use the call-set up process to query an MDN to determine if it is assigned or unassigned. Call set-up queries are submitted to the network with an emulation of the operation of a mobile phone, in the coverage area of a wireless network, or in any other emulation or call-set up approach.

A. Messaging Approaches

1. Network-Based Messaging Approach

Figure 3:
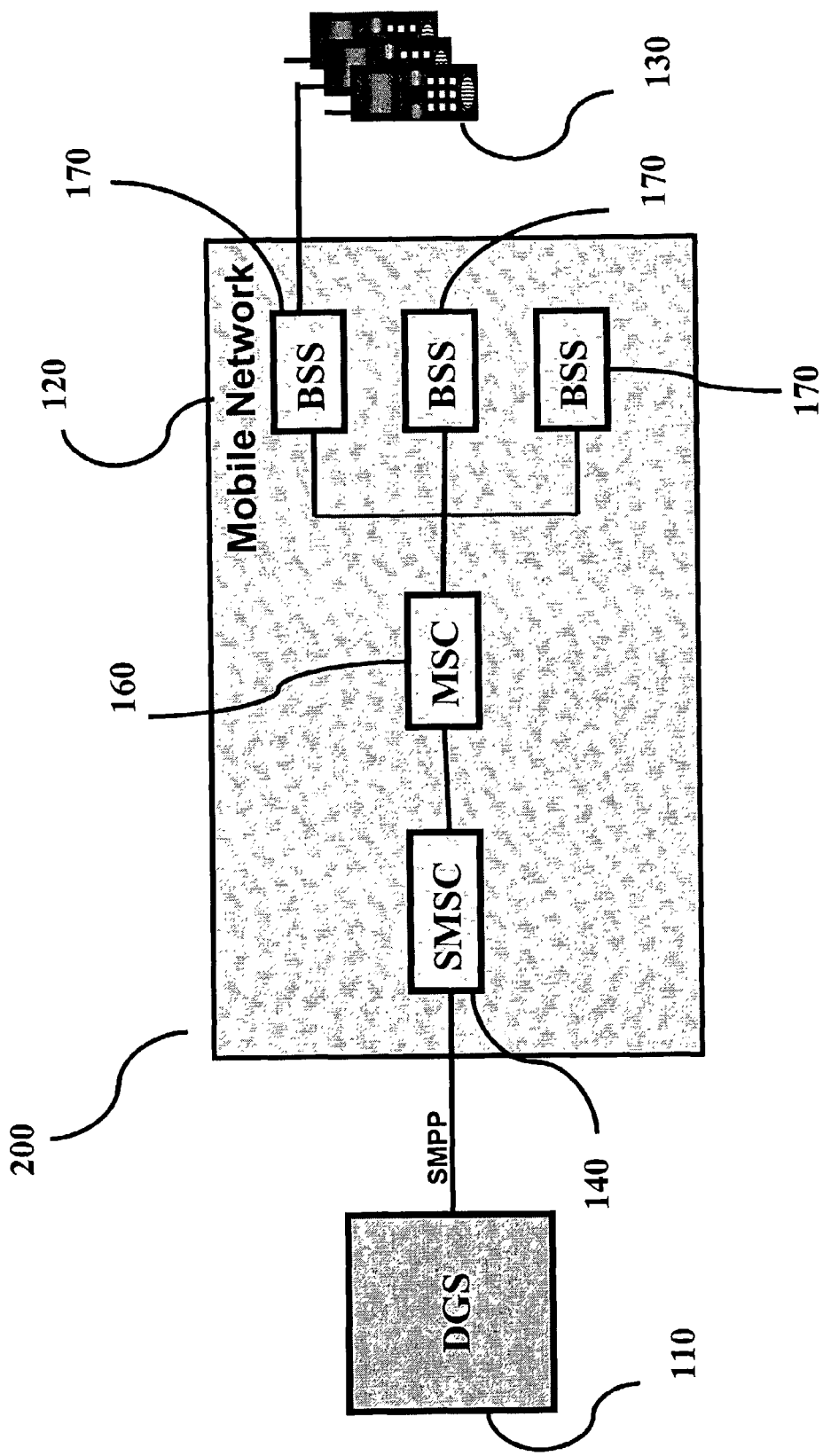
FIG. 3 is a schematic diagram of a system for collecting and analyzing market data in a mobile communications system using a Network-based Contact Messaging approach (e.g., Short Message Point to Point Protocol (SMPP)), according to one embodiment of the present invention.

FIG. 3 illustrates the general architecture of one embodiment of a system 200 for gathering and analyzing market data in a mobile communications system using a network-based messaging approach, such as SMPP. In other non-limiting embodiments, the messages, including SMS, MMS, WAP, IM, and other message types may be sent in a substantially similar manner using other protocols, such as HTTP, SMTP, UCP, and the like. In system 200, the DGS 110 sends SMS contact messages over an intermediary network (e.g., the Internet) using a protocol (e.g., SMPP) which may go directly to a conventional Short Message Service Center (SMSC) 140, which may reside inside or at the edge of a mobile network 120. The SMSC 140 may communicate with one Mobile Switching Center (MSC) 160, which may communicate with one or more Base Station Sub-systems (BSSs) 170, which may in turn communicate with devices 130 corresponding to the MDNs.

When the DGS 110 submits an SMS contact message or query through SMPP, it may request a return receipt from the SMSC 140 using the SMPP protocol. The SMSC 140 may deliver the message through the mobile network 120 and the appropriate air interface, to the addressed mobile communications device 130.

In one non-limiting embodiment, an SMS contact message may be sent using an "invisible" format. In such case, the addressed mobile communications device 130 does not display the SMS contact message on its screen, but still acknowledges its receipt back to the SMSC 140. Upon receiving the acknowledgement, the SMSC 140 notifies the DGS 110.

2. MO-Based Messaging Approach

Figure 4:
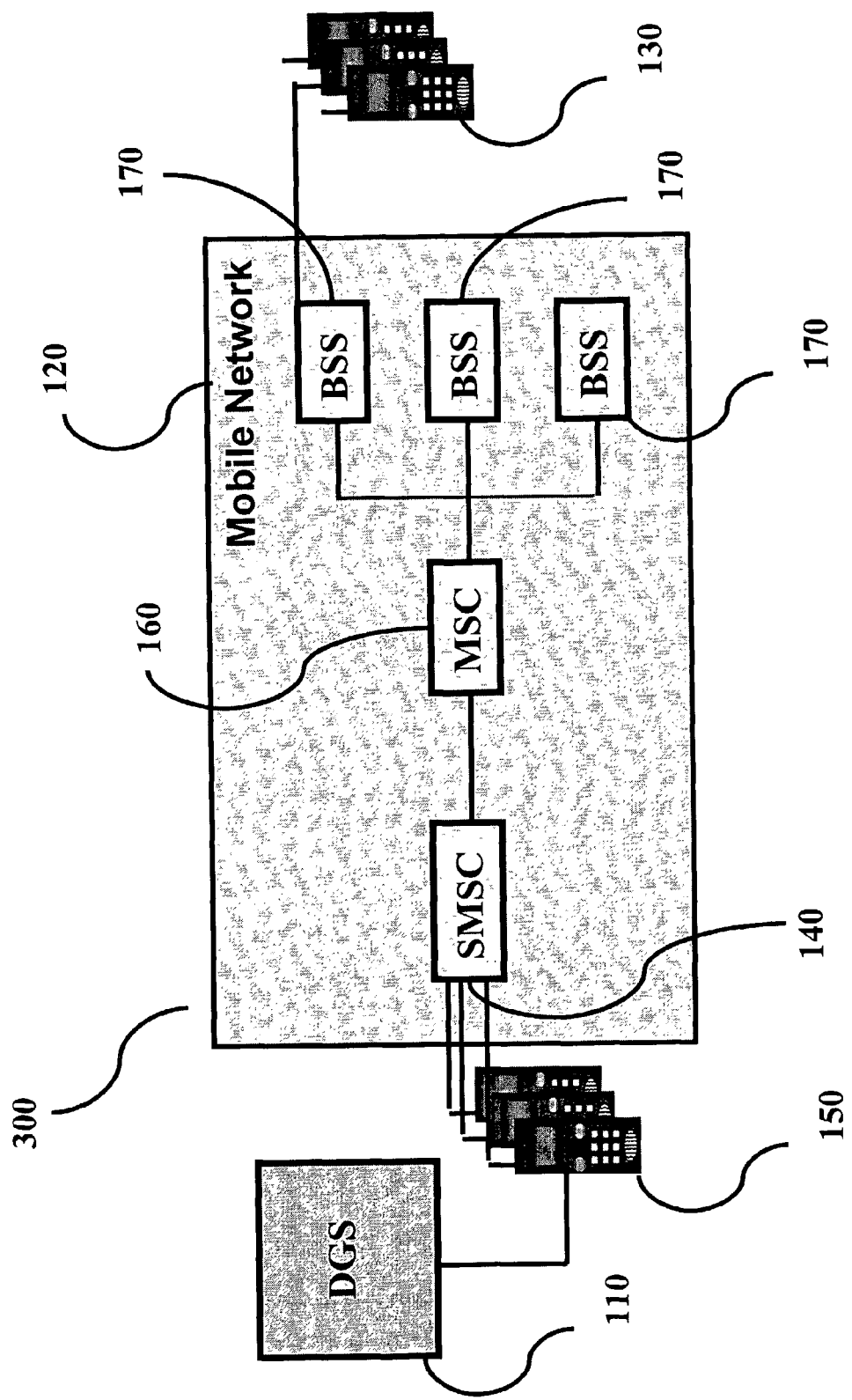
FIG. 4 is a schematic diagram of a system for collecting and analyzing market data in a mobile communications system using a Mobile Originated (MO)-based Contact Messaging approach, according to one embodiment of the present invention.

FIG. 4 illustrates the general architecture of an embodiment of a system 300 for gathering and analyzing market data in a mobile communications system using one or more mobile communications devices 150 to send SMS contact messages. In other non-limiting embodiments, the messages may be sent in a substantially similar manner using VM, MMS, WAP, IM, and the like. The mobile communications device(s) 150 may be communicatively connected to the DGS 110 using any suitable conventional connection method, such as data cables coupled to the ports of the DGS 110 (e.g., COM or USB ports), an infrared interface, or a Bluetooth interface. The DGS 110 instructs the mobile communications device(s) 150 to send the SMS contact message to an addressed mobile communications device using a known protocol, such as Hayes AT commands or any other appropriate protocol. The mobile communications device(s) 150 may communicate with an SMSC 140 residing inside a mobile network 120. The SMSC 140 may communicate with one Mobile Switching Center (MSC) 160, which may communicate with one or more Base Station Sub-systems (BSSs) 170, which in turn may communicate with devices 130 corresponding to the MDNs. For clarity, the originating mobile devices 150 are shown directly connected to the SMSC 140 rather than to the BSS 170.

When the DGS 110 submits an SMS contact message, it instructs the mobile communications device 150 to request a return receipt from the SMSC 140. The SMSC 140 delivers the message through the mobile network 120 and the appropriate air interface, to the addressed mobile communications device 130.

In one non-limiting embodiment, an SMS contact message may be sent using an "invisible" format. In such case, the addressed mobile communications device 130 does not display the SMS contact message on its screen, but still acknowledges its receipt back to the SMSC 140. Upon receiving the acknowledgement, the SMSC 140 returns it back to the mobile phone(s) 150, which in turn, communicates the receipt to the DGS 110.

B. Network Signaling Approach

1. SS7 Direct Connection Network Signaling Approach

Figure 5:
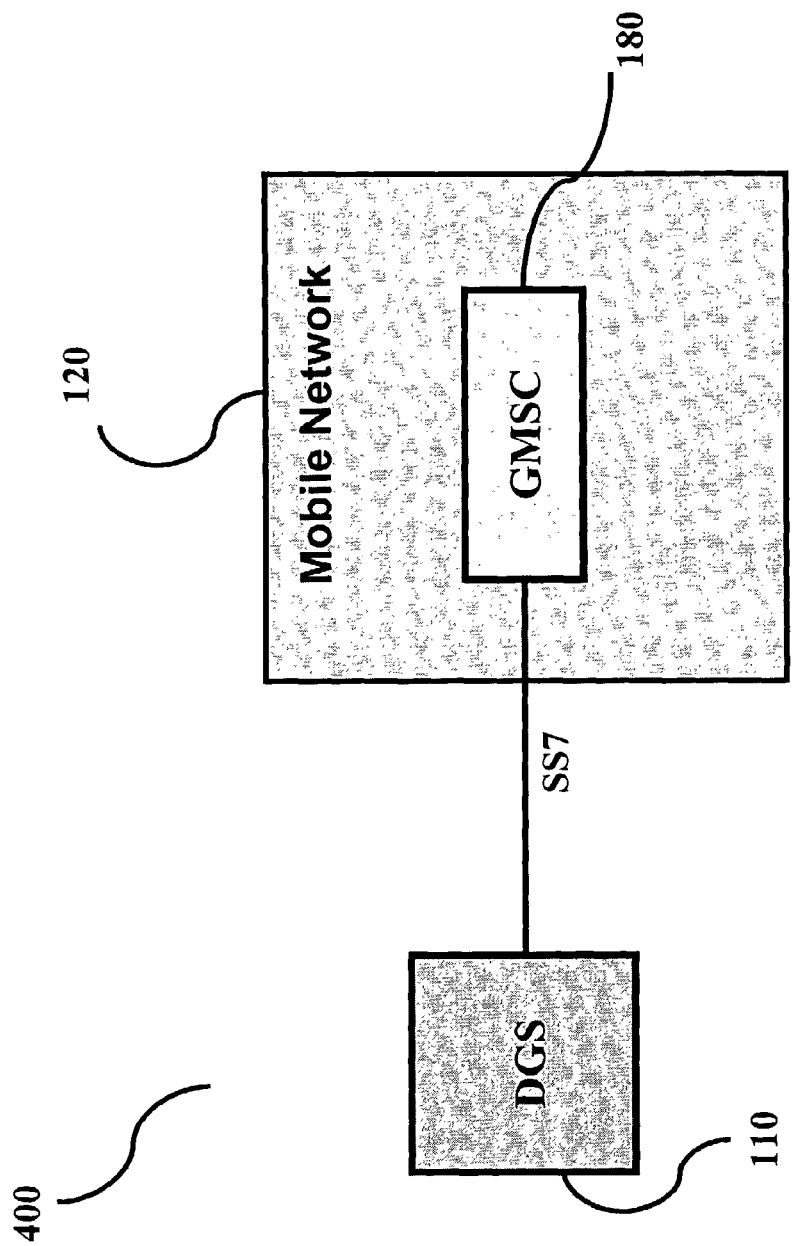
FIG. 5 is a schematic diagram of a system for collecting and analyzing market data in a mobile communications system using an SS7 direct or indirect connection network signaling based approach, according to one embodiment of the present invention.

FIG. 5 illustrates the general architecture of one embodiment of a system 400 for gathering and analyzing market data in a mobile communications system using direct connections to SS7 network signaling. In system 400, the DGS 110 submits an SS7 query to the mobile network and to a Gateway Mobile Switching Center (GMSC) 180. When the DGS 110 submits a query via SS7, it requests an acknowledgement from the GMSC 180 using the SS7 protocol. The GMSC 180 then responds to the acknowledgment request to the DGS 110 using the SS7 protocol.

In one non-limiting embodiment, an SS7 direct connection may be established "invisibly" with a subscriber handset. In such a case, the addressed mobile communications device 130 does not ring or display an incoming call, but a subscriber status acknowledgement is sent back from the GMSC 180 to the DGS 110.

2. SS7 Indirect Connection Network Signaling Approach

Figure 6:
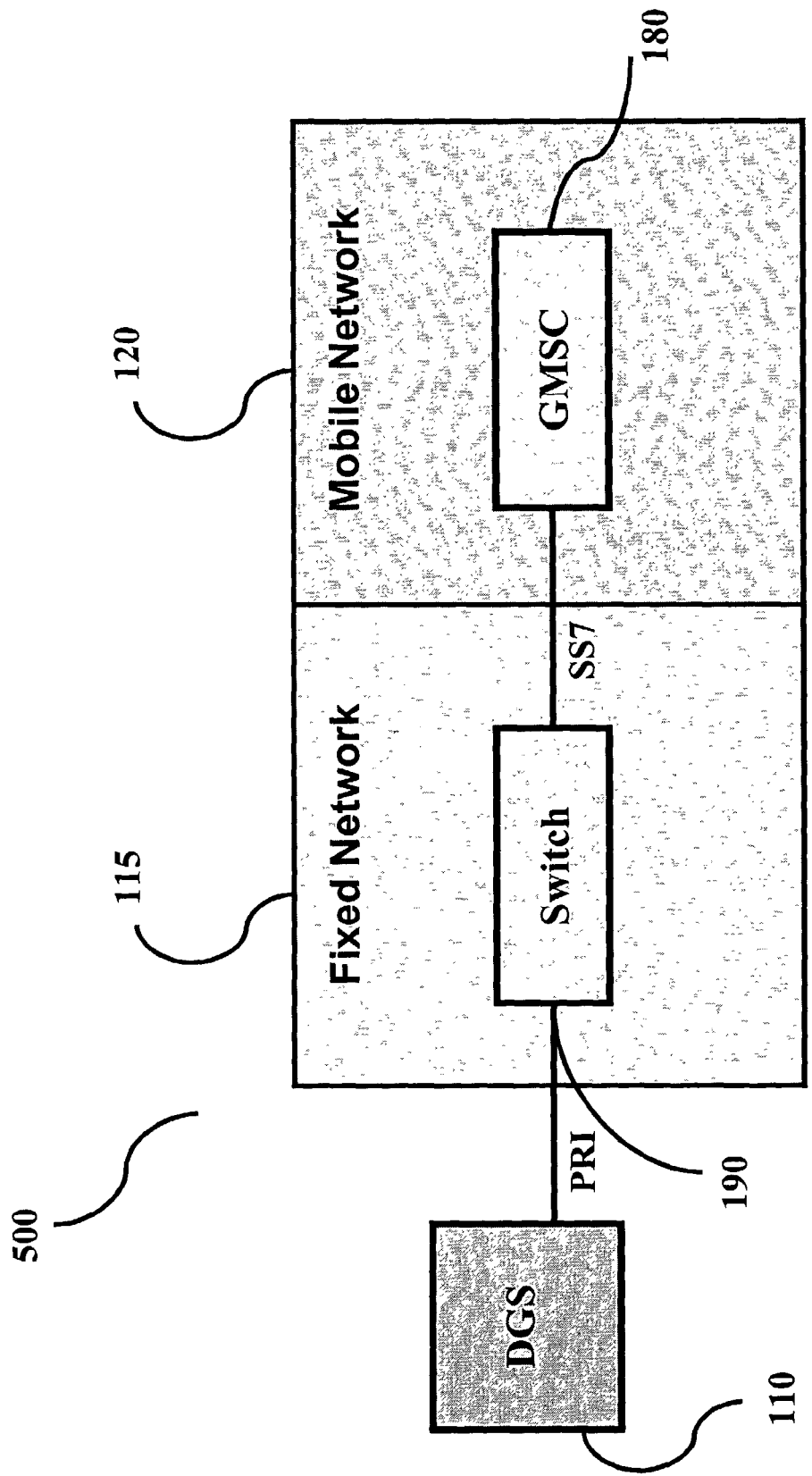
FIG. 6 is a schematic diagram of a system for collecting and analyzing market data in a mobile communications system using an SS7 Primary Rate Interface (PRI) network signaling based approach, according to one embodiment of the present invention.

FIG. 6 illustrates the general architecture of one embodiment of a system 500 for gathering and analyzing market data in a mobile communications system using an SS7 indirect connection network signaling (e.g., an SS7 PRI network signaling approach). In system 500, the DGS 110 submits a PRI query to a switch 190 in the fixed network, which in turn communicates using SS7 with a mobile network and a Gateway Mobile Switching Center (GMSC) 180. When the DGS 110 submits a query via PRI, it requests an acknowledgement from the GMSC 180 using the PRI protocol. The GMSC 180 then responds to the acknowledgment request to the DGS 110 using the PRI protocol.

In one non-limiting embodiment, an SS7 PRI connection may be established "invisibly" with a subscriber handset. In such case, the addressed mobile communications device 130 does not ring or display an incoming call, but a subscriber status acknowledgement is sent back from the GMSC 180 to the switch 190 and from the switch 190 to the DGS 110.

C. Call Set-Up Approach

Figure 7:
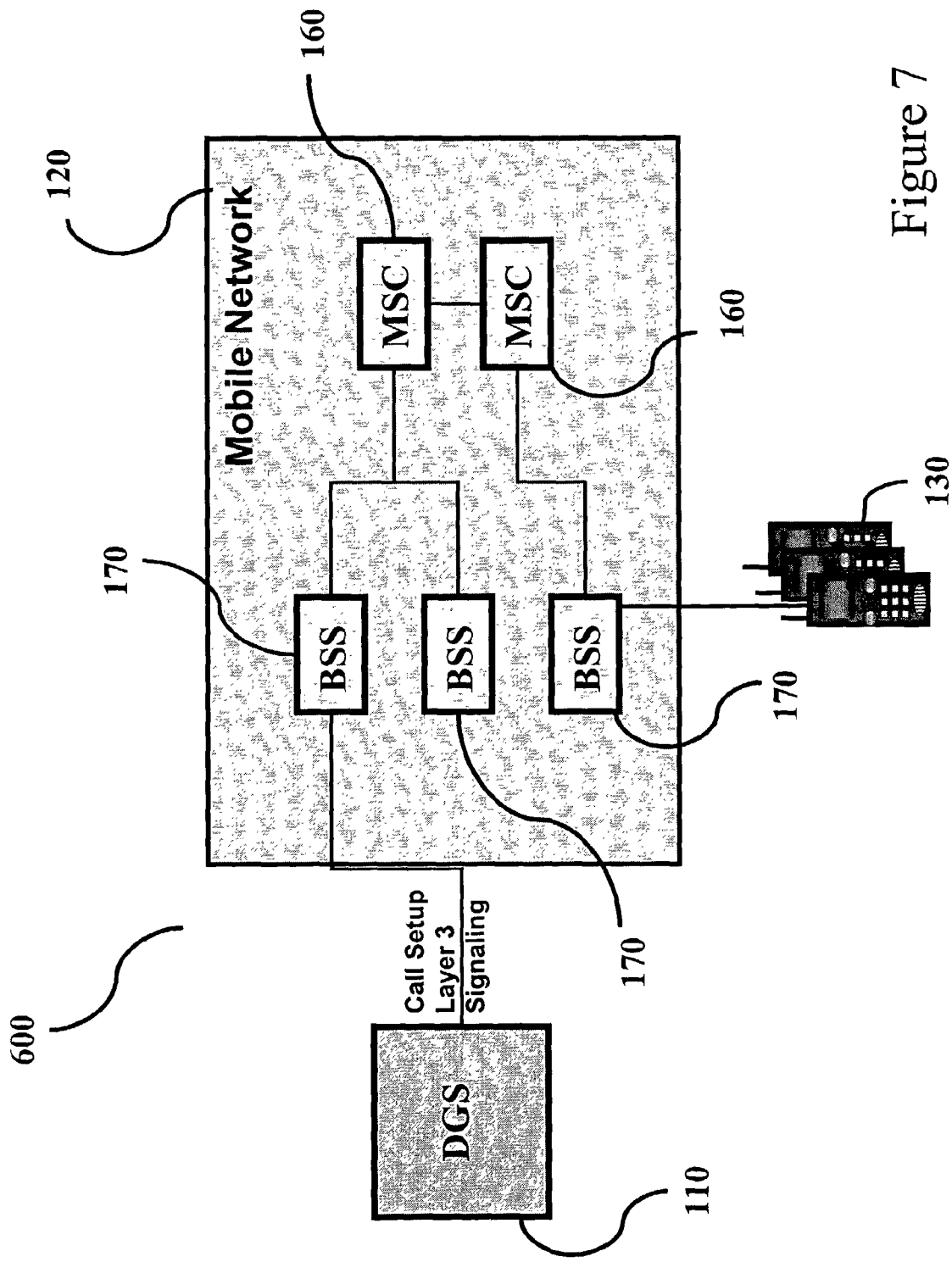
FIG. 7 is a schematic diagram of a system for collecting and analyzing market data in a mobile communications system using a call set-up based approach, according to one embodiment of the present invention.

FIG. 7 illustrates the general architecture of one embodiment of a system 600 for gathering and analyzing market data in a mobile communications system using a call set-up approach. In system 600, the DGS 110 initiates call set-up requests to a Mobile Network 120, via the Base Station Sub-system and its controlling Mobile Switching Center (MSC) 160. The MSC 160 relays the call to the MSC(s) controlling the cell site(s) where the MDN(s) are located. These MSCs in turn communicate with device(s) 130 corresponding to the MDNs. The DGS 110 receives signals from the local BSS 170.

In one non-limiting embodiment, the call set-up request may be made "invisibly" to a subscriber handset. In such case, the addressed mobile communications device 130 does not ring or display an incoming call, but a subscriber status acknowledgement is sent back from the MSC 160 to the BSS 170 and from the BSS 170 to the DGS 110.

III. Contact Methodologies

The present invention may use a variety of methodologies to deliver contacts or queries. Five examples of suitable contact methods are described below in greater detail. It will be appreciated by those skilled in the art that in the following descriptions, the internal operations of a wireless network have been substantially simplified for purposes of clarity, and that the internal operations of a wireless network are not pertinent to the invention as set forth in the appended claims.

A. Messaging Approaches

1. Network-Based Contact Messaging Approach

Figure 8:
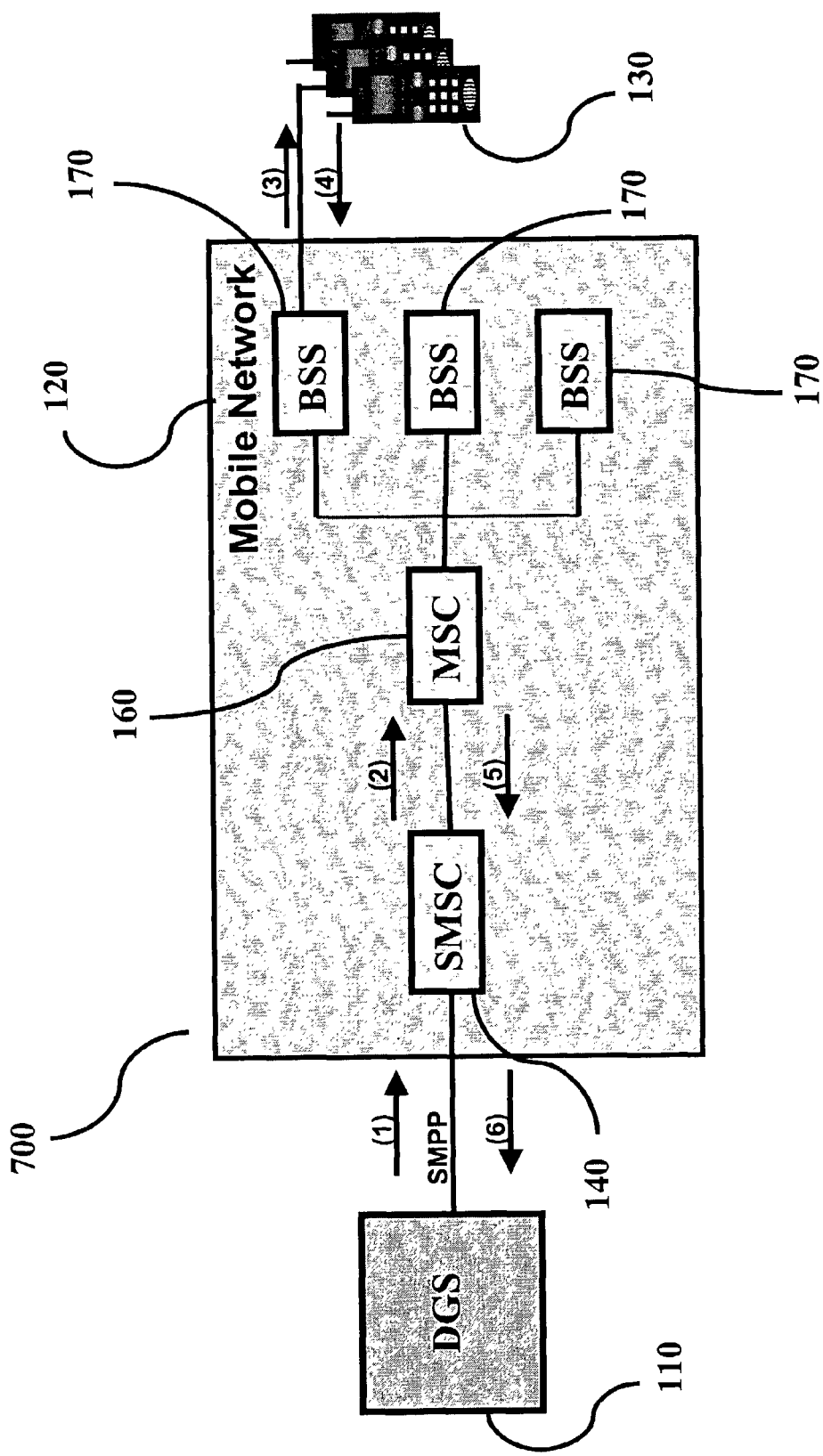
FIG. 8 illustrates a method of delivering Short Messaging Service (SMS) contact messages to one or more mobile communication devices using a network-based contact messaging approach.

FIG. 8 illustrates one embodiment of a method 700 of delivering contacts using a network-based contact messaging approach. The method may be performed by use of a system substantially identical to system 200 of FIG. 3, as indicated by the elements bearing identical reference numerals. The method 700 delivers SMS contacts using a direct connection with SMPP (or another protocol that may or may not interface an SMSC 140 for sending and receiving SMS messages) to a mobile operator, and involves the following steps (shown in parentheses in FIG. 8):

(1) The DGS 110 submits an SMS message to a mobile operator's SMSC 140 using SMPP (or other known protocol that interfaces with the SMSC 140 for sending and receiving SMS messages). A return receipt is requested.

(2) The SMSC 140 sends the SMS message using mobile network internal signaling protocol via the appropriate Mobile Switching Center (MSC) 160 and Base Station Sub-system (BSS) 170 to the cell where the addressed mobile device has been located. If the mobile device cannot be located (e.g., if it is turned off, out of coverage, or otherwise non-reachable), the SMSC 140 may store the SMS message and retry sending the message at certain predetermined intervals.

(3) The SMS message is delivered over the air interface to the addressed mobile communications device 130.

(4) The mobile communications device 130 acknowledges the SMS message through the air interface.

(5) The acknowledgement is returned through the internal signaling of the mobile network to the SMSC 140.

(6) The SMSC 140 returns the acknowledgement to the DGS 110 via SMPP or any other suitable protocol.

2. MO-Based Contact Messaging Approach

Figure 9:
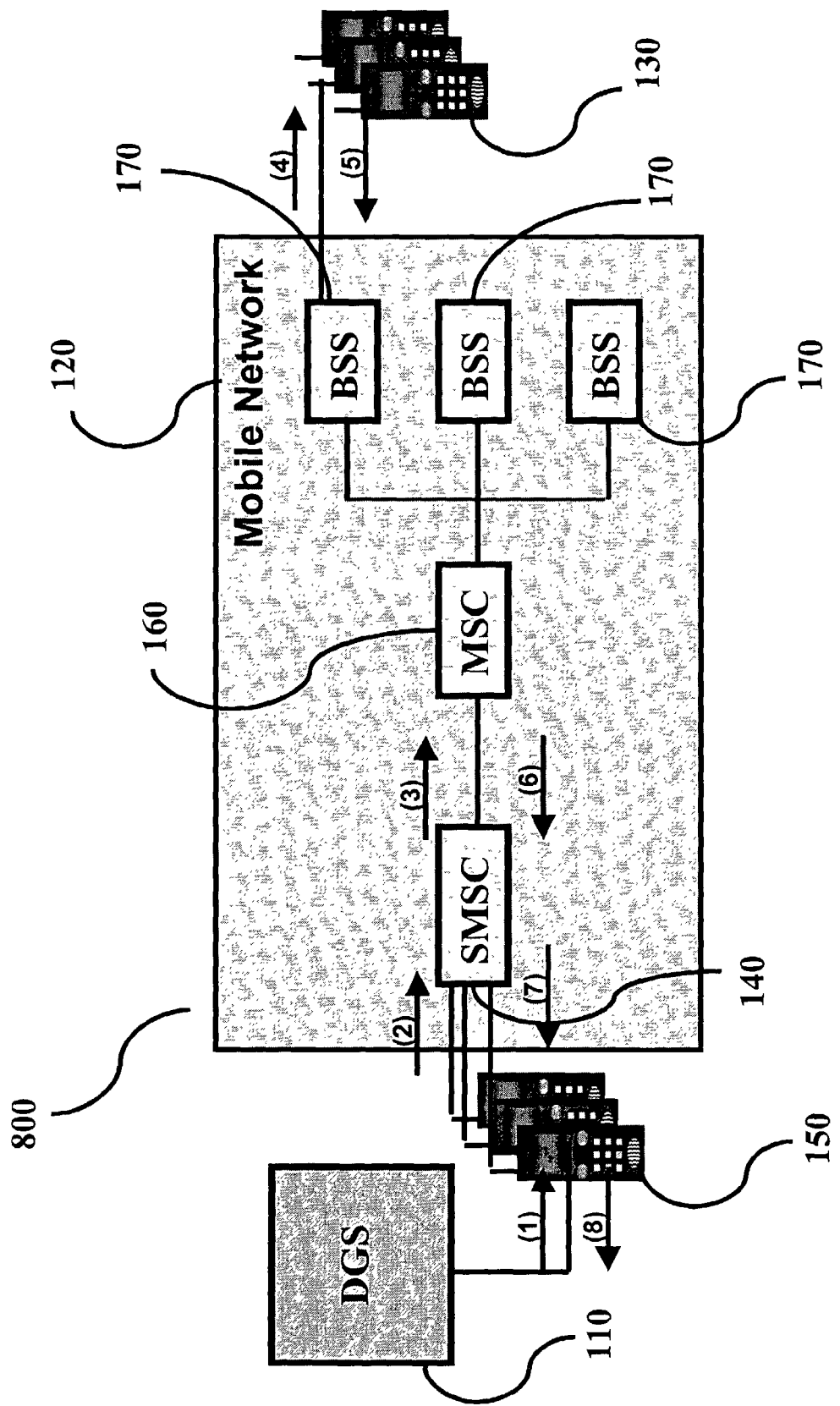
FIG. 9 illustrates a method of delivering SMS contact messages to one or more mobile communication devices using an MO-based contact messaging approach.

FIG. 9 illustrates a method 800 of delivering contacts using an MO-based contact messaging approach. The method may be performed by use of a system substantially identical to system 300 of FIG. 4, as indicated by the elements bearing identical reference numerals. The method 800 delivers SMS contacts to a mobile operator by use of one or more mobile communications devices 150, and involves the following steps (shown in parentheses in FIG. 9):

(1) The DGS 110 submits an SMS message to one or more mobile communications devices 150.

(2) The mobile communication devices 150 send the SMS message to the addressed mobile communications device 130. This results in submitting the SMS message to a mobile operator's SMSC 140. A return receipt is requested.

(3) The SMSC 140 sends the SMS message using the internal signaling of the mobile network via the appropriate Mobile Switching Center (MSC) 160 and Base Station Sub-system (BSS) 170 to the cell where the addressed mobile device 130 has been located. If the mobile communications device 130 cannot be located (e.g., if it is turned off, out of coverage, or otherwise unreachable), the SMSC 140 stores the SMS message and retries sending the message at certain intervals.

(4) The SMS message is delivered over the air interface to the addressed mobile communications device 130.

(5) The mobile communications device 130 acknowledges the SMS message through the air interface.

(6) The acknowledgement is returned through the mobile network internal signaling to the SMSC 140.

(7) The SMSC 140 returns the acknowledgement to the mobile communications device 150 that sent the SMS message.

(8) The DGS 110 obtains the return receipt from the mobile communications device 150.

The DGS 110 may employ one or more formats for the SMS or other messages it uses to contact the addressed mobile devices. For example, the DGS 110 may use an SMS message having a conventional format that is visible to the addressed device. The DGS 110 may also send SMS messages in an "invisible" format (i.e., in a format that is not displayed by the receiving device). There are a variety of ways to confirm an SMS message so that it does not alert or appear on a subscriber's mobile communications device.

Figure 10:
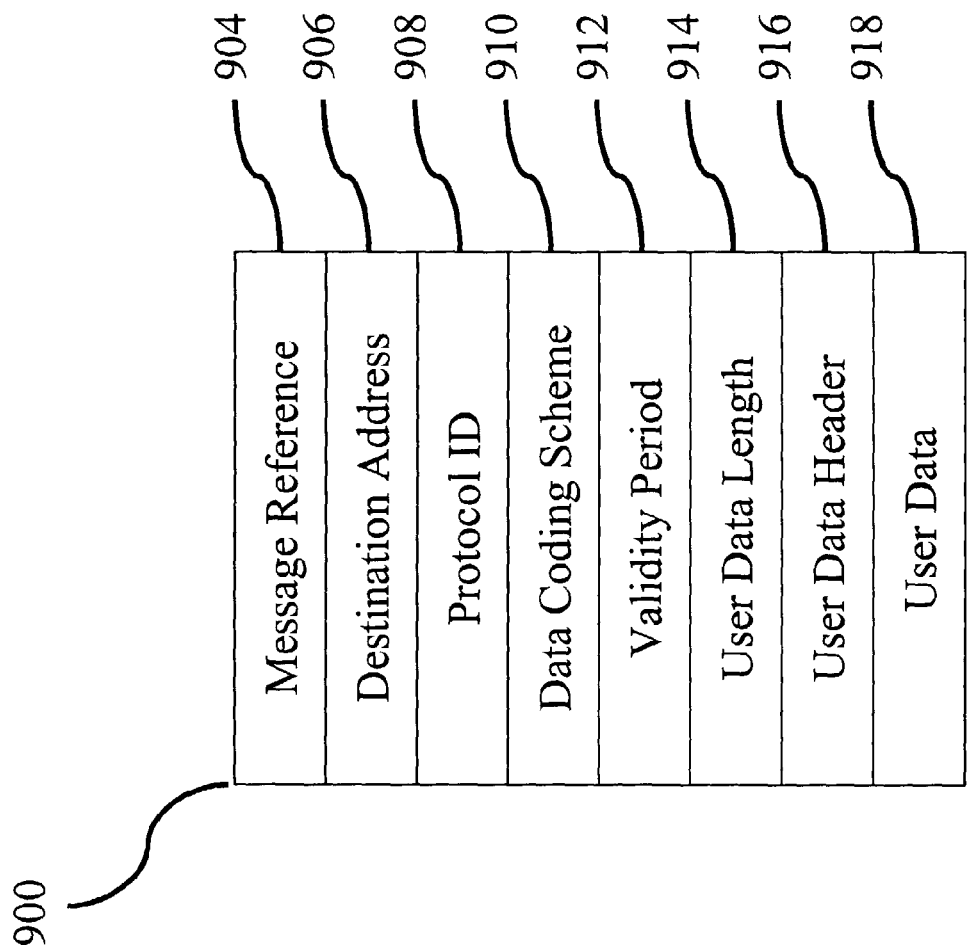
FIG. 10 is a block diagram illustrating a general representation of a portion of the structure of one non-limiting type of SMS contact message.

A general representation of a portion of the structure of one type of SMS message 900, as defined in GSM Specification 03.40, pages 41-43 of ETSI TS 100 901 V7.4.0 (1999-12), is illustrated in FIG. 10. The SMS message 900 may include a message reference portion 904, a destination address portion 906, a protocol ID portion 908, a data coding scheme portion 910, a validity period portion 912, a user data length portion 914, a user data header portion 916, and a user data portion 918.

One approach of sending an "invisible" SMS message is to configure the SMS message in the following manner:
No data in the user data portion 918
A User Data Header (UDH) portion 916 with the following settings:
IE set to "special message indication"
Arbitrary message indication
Number of message: 0
Receiving mobile station (MS) may discard message In another example of an "invisible" format, the User Data Header (UDH) portion 916 for the SMS message is configured such that the receiving mobile device may discard the contents of the message and the Message Waiting Indicator is set to inactive. One way to achieve this is to set Coding Group Bits 7 . . . 4 of the TP-DCS (Data Coding Scheme) within the UDH portion 916 (defined in GSM specification 03.38 and 03.40) to '1100', while setting bit 3 to '0.' As should be appreciated by those skilled in the art, SMS messages may be made "invisible" by use of other methods than those described above, and the present invention should not be considered to be limited thereto.

B. Network Signaling Approaches

1. SS7 Direct Connection Network Signaling Approach

Figure 11:
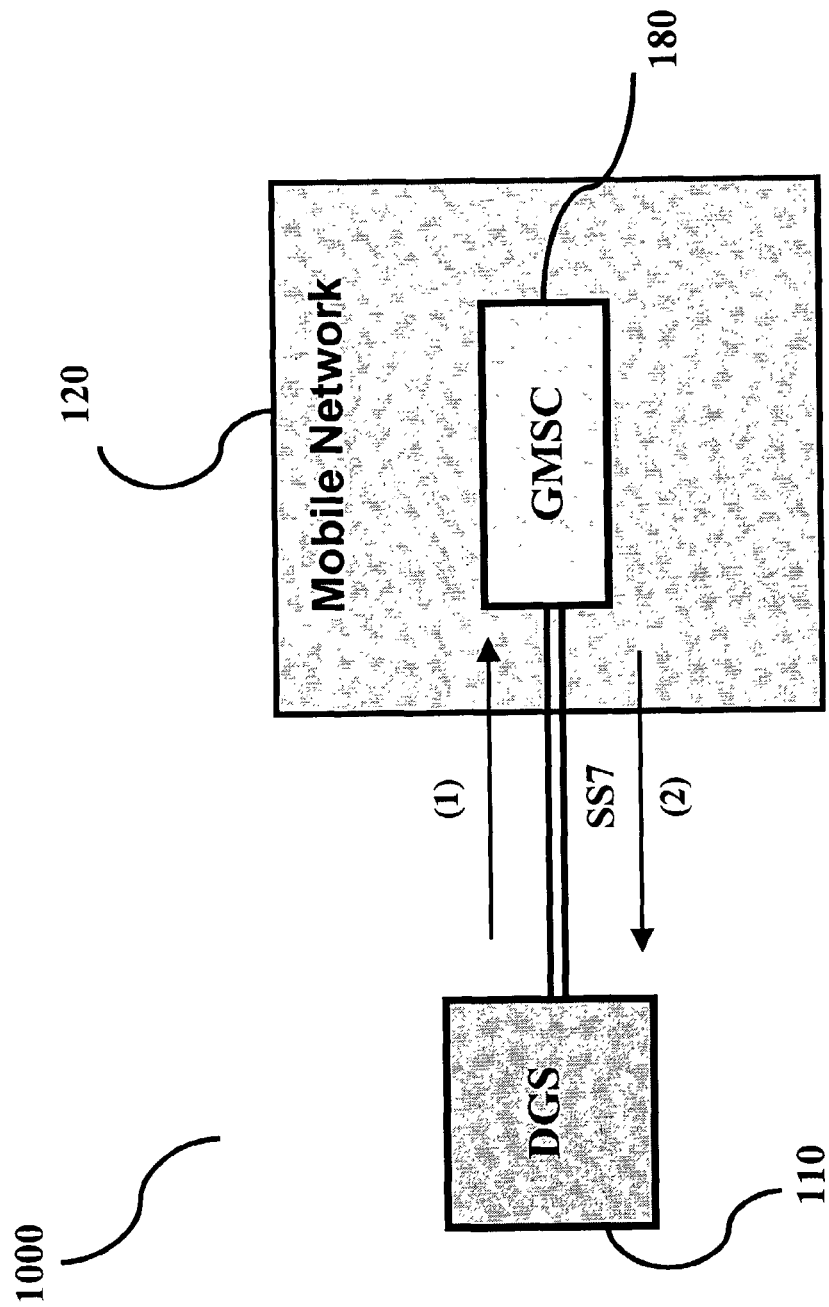
FIG. 11 illustrates a method of making contacts to one or more mobile communication devices using an SS7 direct connection approach.

FIG. 11 illustrates a method 1000 of delivering contacts using an SS7 direct connection network signaling approach. The method may be performed by use of a system substantially identical to system 400 of FIG. 5, as indicated by the elements bearing identical reference numerals. The method 1000 delivers network signaling contacts using a direct connection with SS7 to a Gateway Mobile Switching Center (GMSC) 180 (or using another protocol for originating and receiving network signaling with a GMSC 180) to obtain the status of the MDNs, and involves the following steps (shown in parentheses in FIG. 11):

(1) The DGS 110 submits a call setup request to a GMSC 180 using SS7 (or other known protocol that interfaces with the GMSC or provides an equivalent mobile network function for originating and receiving network signaling).

(2) The GMSC 180 performs a database lookup of the received mobile station number and returns an acknowledgement using SS7 or other suitable protocol to the DGS 110.

Figure 12:
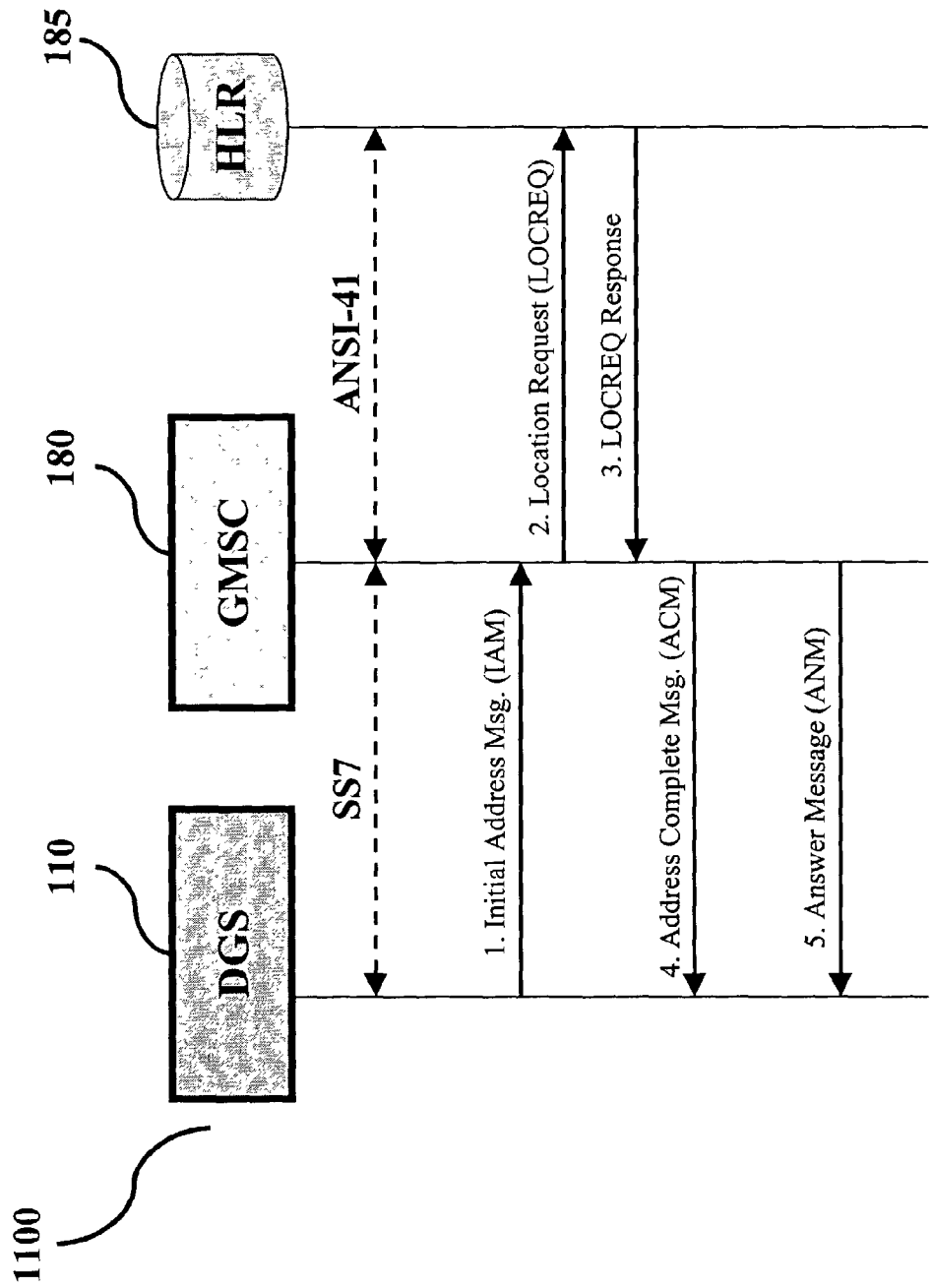
FIG. 12 is a non-limiting example of the SS7 messaging that one would observe when making contacts to mobile communication devices using an SS7 direct connection approach.

FIG. 12 illustrates an exemplary embodiment of an SS7 messaging method 1100 that may be used in method 1000. The present invention is not limited to these exemplary embodiments, but can be practiced with any type of suitable signaling mechanisms. Method 1100 involves the following steps:

1) The DGS 110 submits an SS7 ISUP Initial Address Message (IAM) to the Gateway Mobile Switching Center (GMSC) 180.

2) The GMSC 180 receives the IAM message, performs routing analysis, and send an ANSI-41 Location Request (LOCREQ) message to a Home Location Register (HLR) 185 for an MDN.

3) The HLR 185 performs a database lookup of the received MDN and returns a LOCREQ response to the GMSC 180 indicating if the MDN is assigned or unassigned.

4) The GMSC 180 converts the ANSI-41 LOCREQ response to an SS7 ISUP Address Complete Message (ACM) and returns the ACM message with the assigned/unassigned indicator to the DGS 110.

The specific elements of the ACM which are of interest are
  a. The ACM Backward Call Indicator, which has two parameters of interest:
    i. 'Charge Indicator' with the following values:
      1. No indication
      2. No Charge (this should be the return value for an Unassigned MDN)
    ii. 'Called Party's Status Indicator' with the following values:
      1. No Indication
      2. Subscriber free
      3. Excessive Delay b. The ACM Cause Indicator which has one parameter of interest:
  i. Unallocated Destination Number (this should be the return value for an unassigned MDN)
When the ACM/Alert message is received, logic of the following sort may be applied:
  IF Backward Call Indicator-Called Party Status is set to 'excessive delay' OR 'subscriber free'
  THEN Record as assigned MDN
    terminate/release the call.
  IF Backward Call Indicator-Charge is set to 'No Charge' AND Cause Indicator is set to "Unallocated Destination Number'
  THEN terminate/release call
    Record as unassigned MDN
  ELSE If the returned parameter values in 'Backward Call Indicator' and 'Cause code' do not accurately or reliably indicate an unassigned number,
    AND the combination of returned parameters indicates that the call is not progressing to the calling party.
    THEN continue monitoring the call and listen to the audio message generated by the MSC.
    ELSE terminate call and record status as indeterminate.
5) Assuming that the call has not been terminated, the GMSC 180 returns an Answer Message (ANM) to the DGS 110, indicating that the call is being connected. The DGS 110 then waits for the call completion on the indeterminate cases and recognizes the unassigned MDN announcement using speech recognition.

2. SS7 Indirect Connection Network Signaling Approach

Figure 13:
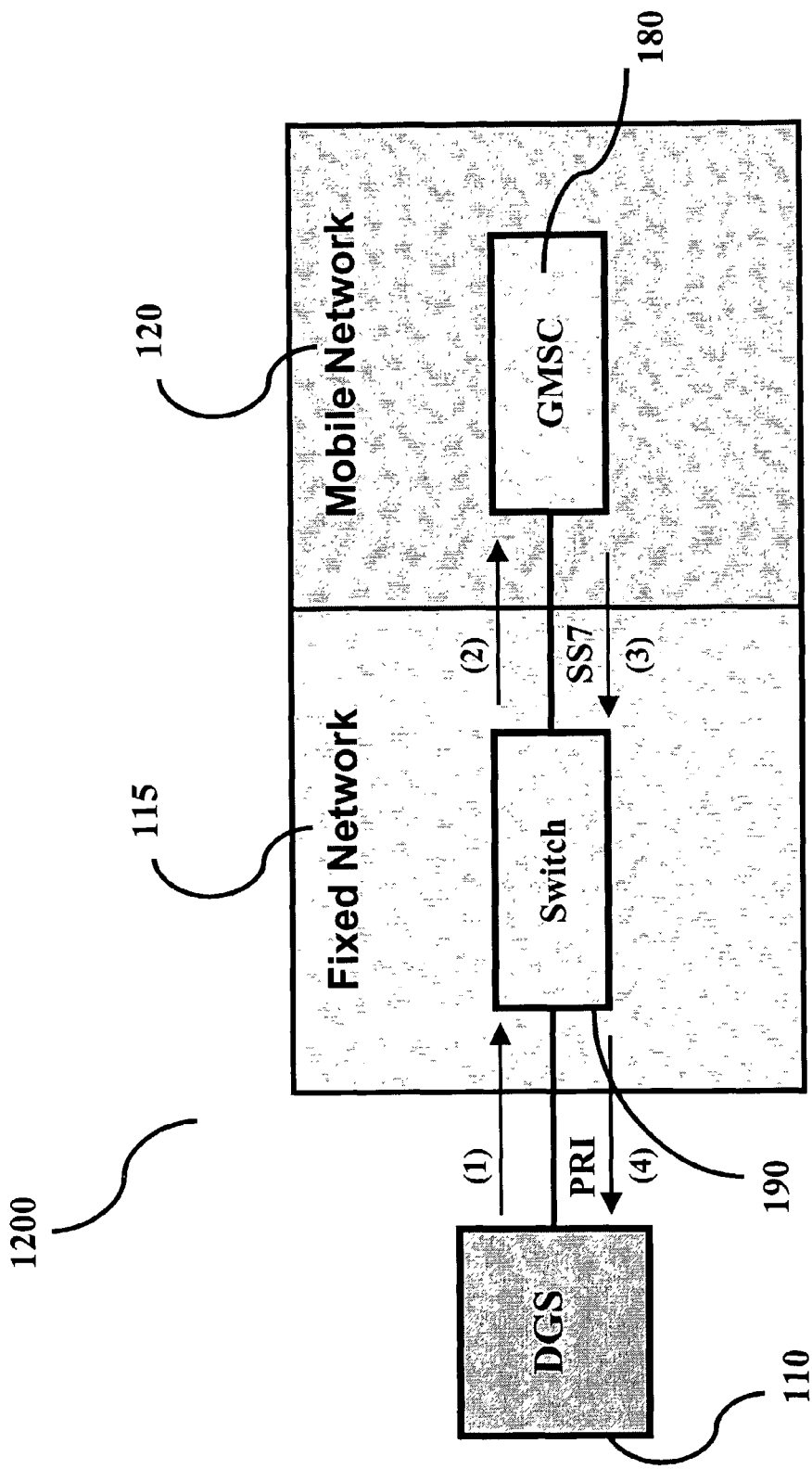
FIG. 13 illustrates one method of making contacts to one or more mobile communication devices using an SS7 indirect connection approach, using an SS7 PRI connection.

FIG. 13 illustrates a method 1200 of delivering contacts using an indirect SS7 connection network signaling approach (e.g., using an SS7 PRI connection). While the indirect connection method shown in FIG. 13 involves the use of an SS7 PRI connection, it should be appreciated that any other indirect SS7 connection methods may also be used. The method may be performed by use of a system substantially identical to system 500 of FIG. 6, as indicated by the elements bearing identical reference numerals. The method 1200 delivers network signaling contacts using a connection with PRI to a switch 190 (or using another protocol to interface to a switch 190 for originating and receiving network signaling) to obtain the status of the MDNs, and involves the following steps (shown in parentheses in FIG. 13):

(1) The DGS 110 submits a call setup request to a switch 190 using PRI (or other known protocol that interfaces with the switch 190 for originating and receiving network signaling).

(2) The switch 190 sends the call setup request using SS7 or other suitable protocol to the appropriate Gateway Mobile Switching Center (GMSC) 180.

(3) The GMSC 180 performs a database lookup of the received mobile station number and returns an acknowledgement using SS7 or other suitable protocol to the switch 190.

(4) The switch 190 returns the acknowledgement to the DGS 110 via PRI or any other suitable protocol.

Figure 14:
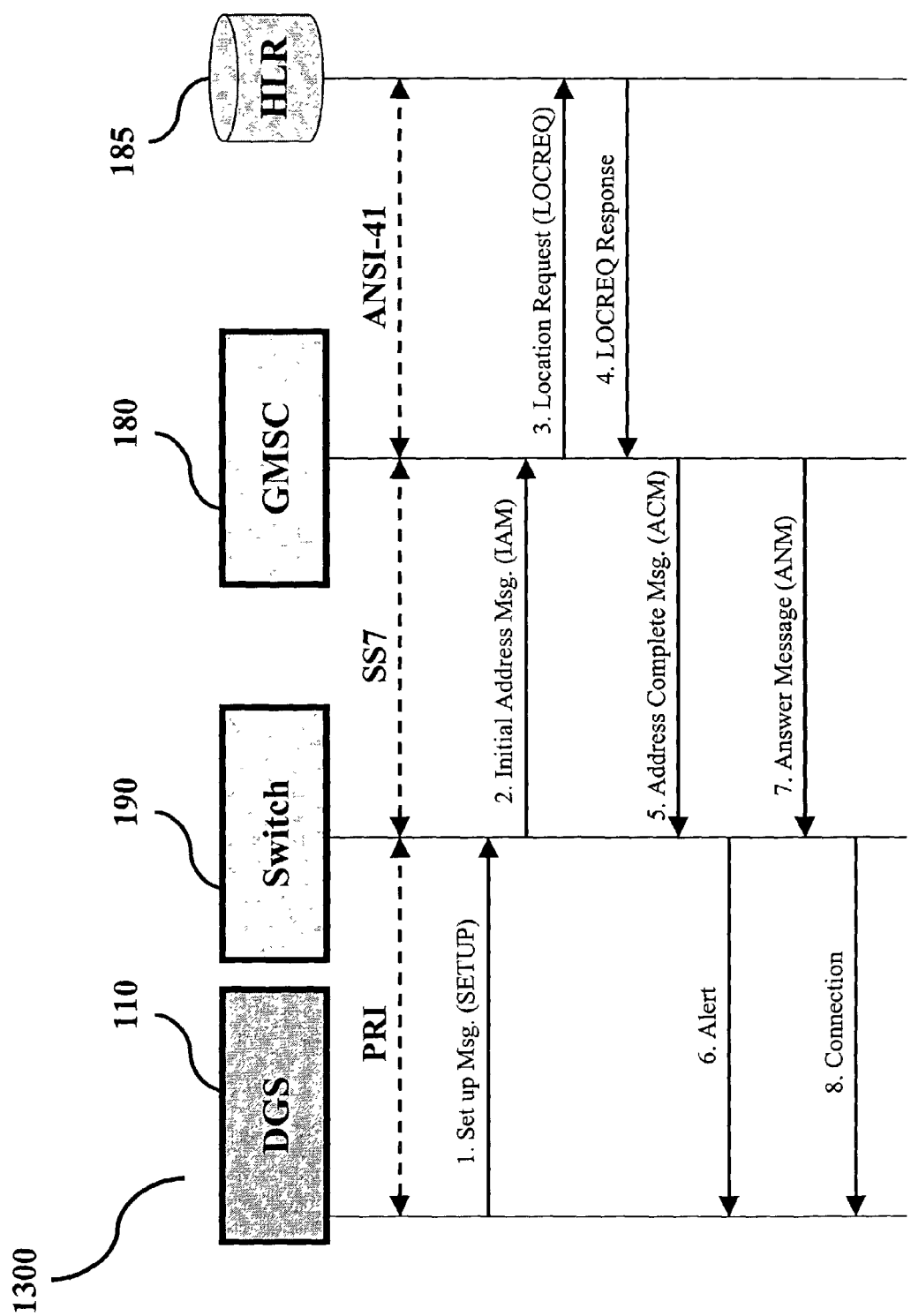
FIG. 14 is a non-limiting example of the PRI messaging that one would observe when making contacts to mobile communication devices using an SS7 PRI connection approach.

FIG. 14 illustrates an exemplary embodiment of a PRI messaging method 1300 that may be used in method 1200. The present invention is not limited to these exemplary embodiments, but can be practiced with any type of suitable signaling mechanism. Method 1300 involves the following steps:

1) The DGS 110 submits a PRI set up (SETUP) message to the switch 190.

2) The switch 190 converts the PRI call SETUP message to the SS7 ISUP Initial Address Message (IAM) and sends the IAM message to the Gateway Mobile Switching Center (GMSC) 180.

3) The GMSC 180 receives the IAM message, performs routing analysis, and sends an ANSI-41 Location Request (LOCREQ) message to the HLR 185.

4) The HLR 185 performs a database lookup of the received MDN and returns a LOCREQ response to the GMSC 180 indicating if the MDN is assigned or unassigned.

5) The GMSC 180 converts the ANSI-41 LOCREQ response to an SS7 ISUP Address Complete Message (ACM) and returns the ACM message with the assigned/unassigned indicator to the switch 190.

6) The switch 190 converts the SS7 ISUP ACM Message to the PRI Alert Message and returns the Alert Message with the assigned/unassigned indicator to the DGS 110. SS7 call set up parameters map directly onto PRI, therefore the information contained in this message will be the same as that described above for the ACM message in reference to FIG. 12. This message effectively indicates that the called user is being alerted.

7) The GMSC 180 returns an Answer Message (ANM) to the switch 190, containing further information regarding the assigned/unassigned state of the MDN. The contents of this message are described above in reference to FIG. 12.

8) The switch 190 forwards and sends a Connection Message to the DGS 110, containing further information regarding the assigned/unassigned state of the MDN. SS7 call set up parameters map directly onto PRI, therefore the information contained in this message will be the same as that described above for the ACM message in reference to FIG. 12.

The logic described above in reference to FIG. 12, for analysis upon receipt of the ACM message will also apply to the PRI case.

C. Call Set-Up Approach

Figure 15:
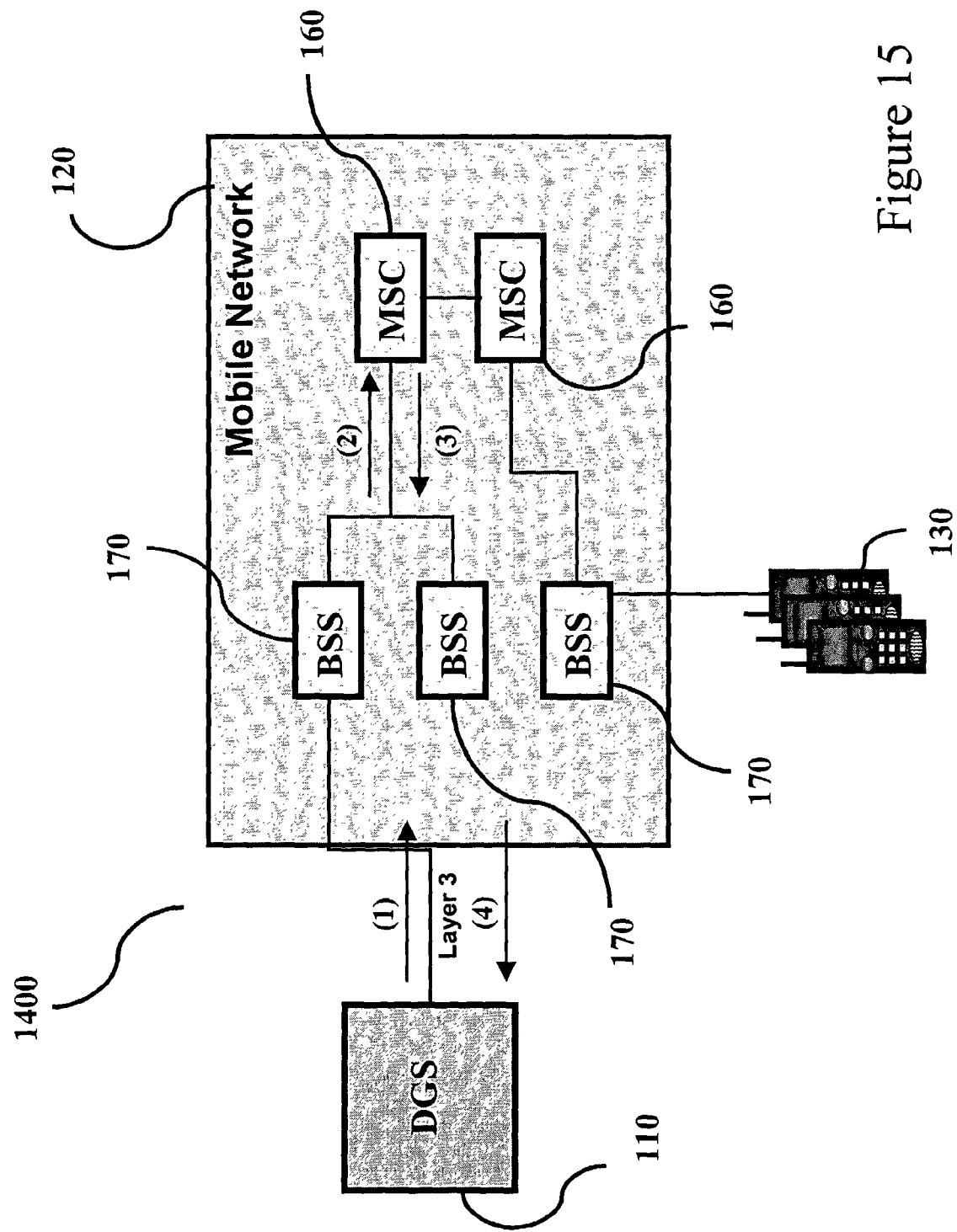
FIG. 15 illustrates one method of making contacts to one or more mobile communication devices using a call set-up approach.

FIG. 15 illustrates a method 1400 of querying the state of an MDN using a call set-up approach. The method may be performed by use of a system substantially identical to system 600 of FIG. 7, as indicated by the elements bearing identical reference numerals. The method 1400 queries an MDN by initiating a call and monitoring layer 3 signaling messaging reported back by the network.

As indicated in FIG. 15, the DGS 110 is capable of both call initiation, and monitoring the progress of the call. Specifically, the DGS 110 initiates a call, then monitors the progress of the call as reported by the network.

Method 1400 involves the steps below, referring to the signaling illustrated in more detail in FIGS. 17, 18, 19, and 20 for a GSM example. This invention is not limited to this single GSM embodiment. Similar techniques can be used for CDMA, TDMA, iDEN and other wireless technologies. The signal paths are described in FIG. 15, which shows the general operation of method 1400.

(1) The DGS 110 initiates a call. The Channel Request 17-1 and Service Request 17-2 are handled by the BSS controlling the cell site in which the DGS 110 has registered and the Mobile Switching Center (MSC) 160 responsible for the BSS. The network responds to the Channel Request optionally with an immediate assignment 17-2.

(2) The MSC 160 proceeds with normal originating end call handling, meaning that having received the service request 17-3, it will place the mobile device in encrypted mode (FIGS. 17-4 and 5) and accept a call setup message (FIGS. 17-6) from the mobile device.

(3) The MSC 160 responds to the Setup message 17-6 with a Call Proceeding indicator 17-7 and an Assignment Command 17-8 to which the DGS 110 responds with Assignment Complete 17-9. The network may optionally respond to the Setup with a Release (with a cause) 18-10 (see FIG. 18) at this point if the MDN is unallocated. If this is the case, the MDN is definitely unallocated.

(4) Should the process continue, subsequent to the Assignment Complete, a definitive view of the status of the MDN emerges; comparing 17-10, 18-20 (see FIG. 18), 19-10 (see FIG. 19) and 20-10 (see FIG. 20) it is clear that if a progress indicator is received the MDN is assigned. Otherwise it is not.

Figure 16:
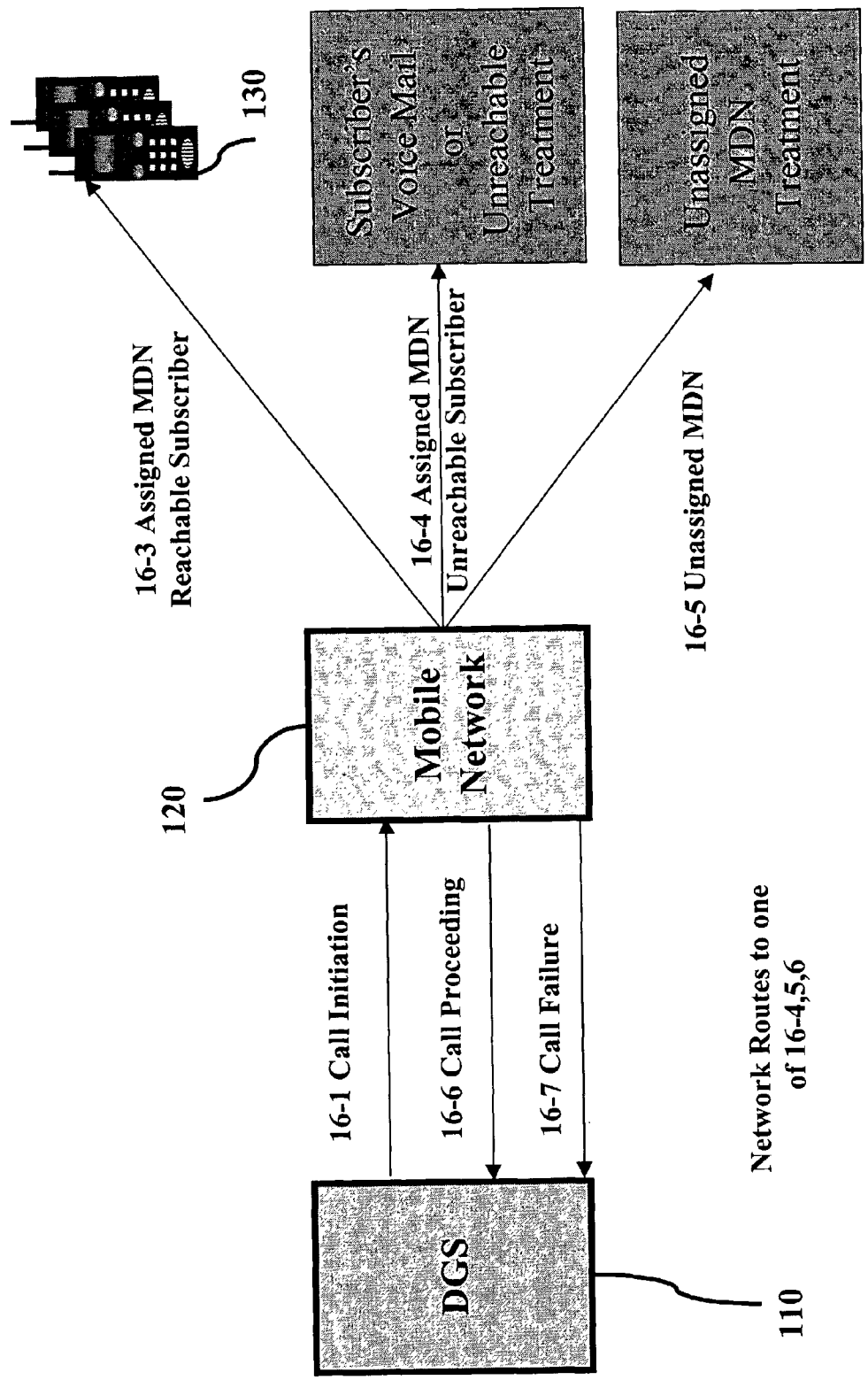
FIG. 16 is a non-limiting example of the call signaling that one would observe in a mobile network, enabling the call setup method.
Figure 17:
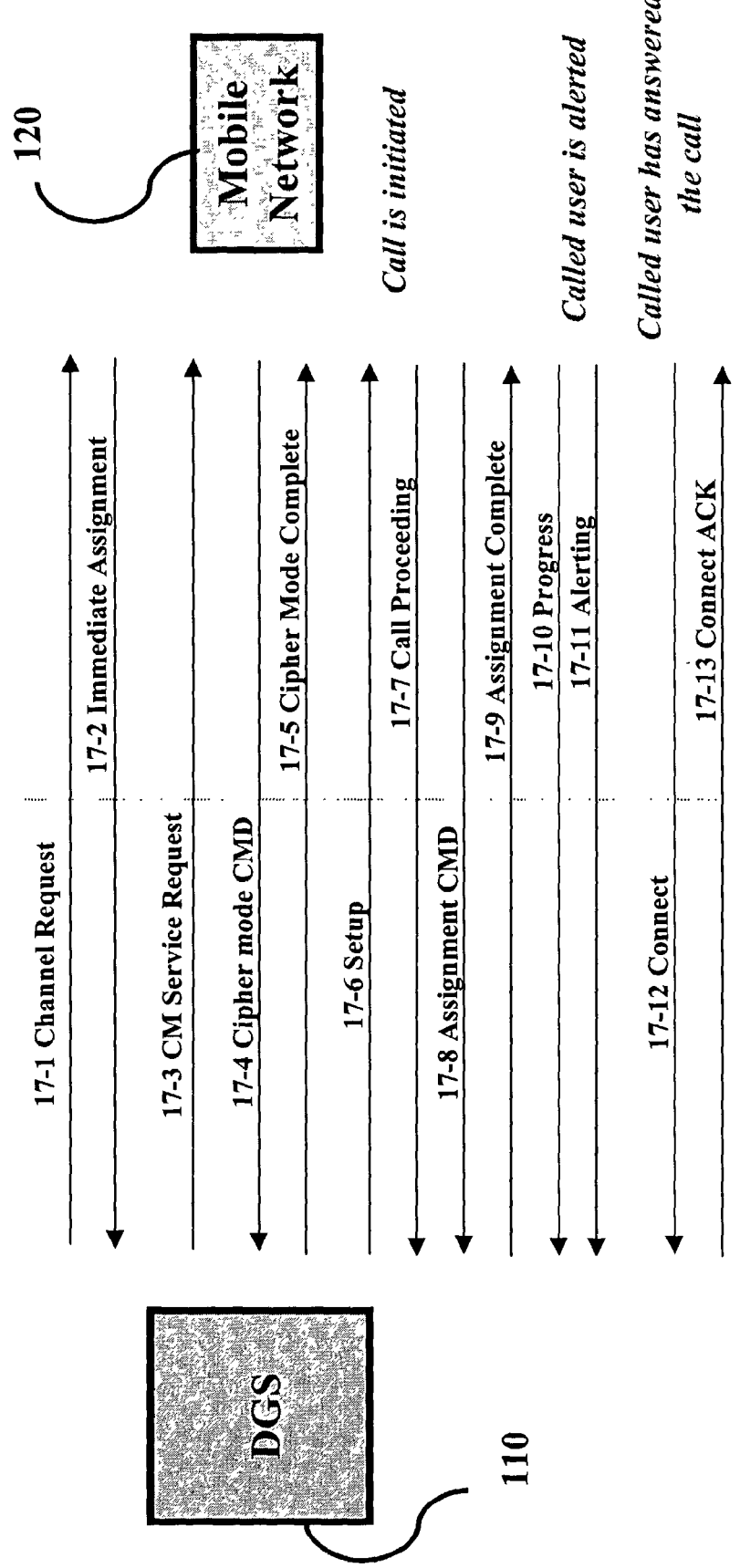
FIG. 17 is a non-limiting example of the call signaling that one would observe for a GSM network with an MDN assigned to a reachable subscriber.
Figure 18:
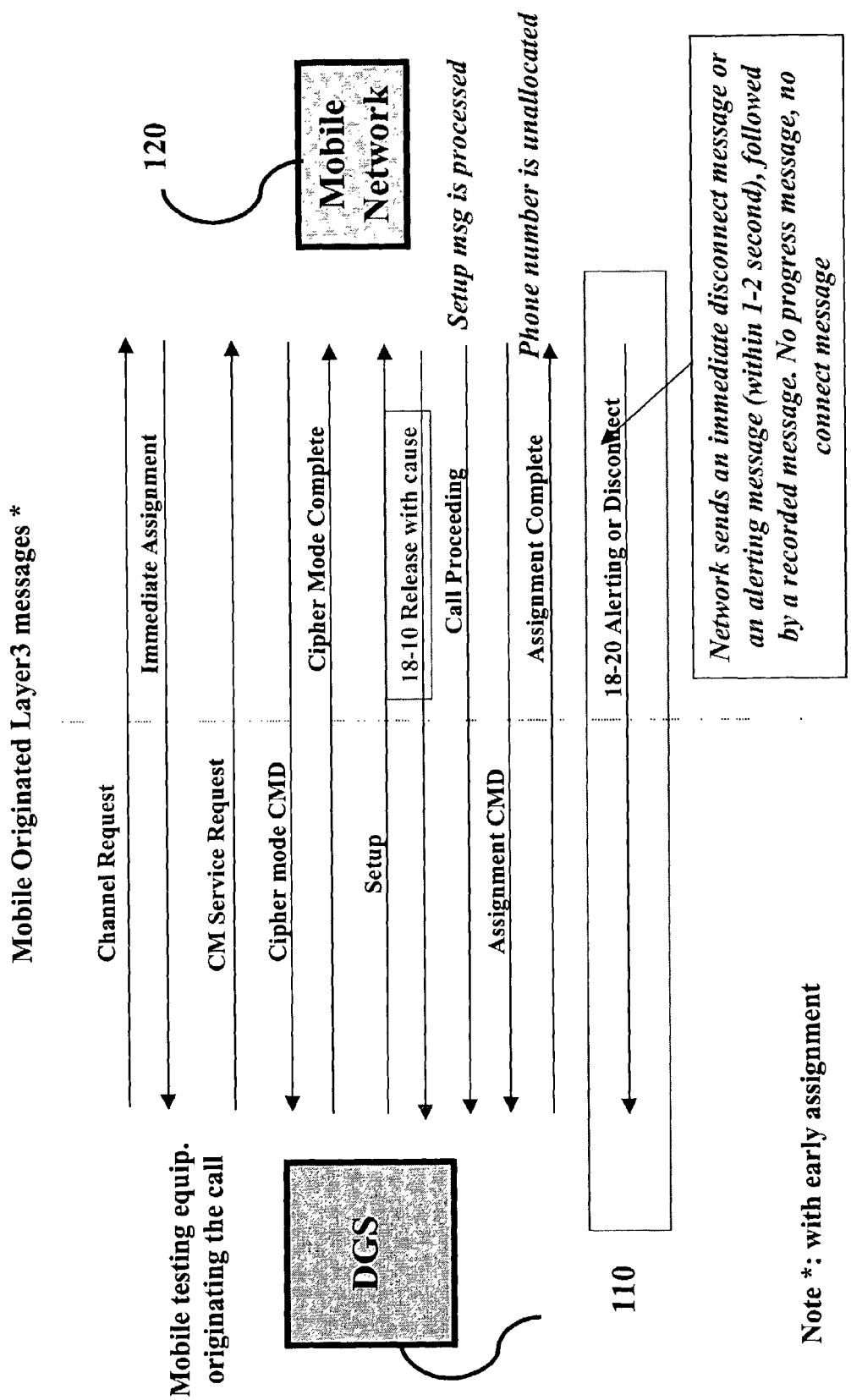
FIG. 18 is a non-limiting example of the call signaling that one would observe for a GSM network with an unassigned MDN.
Figure 19:
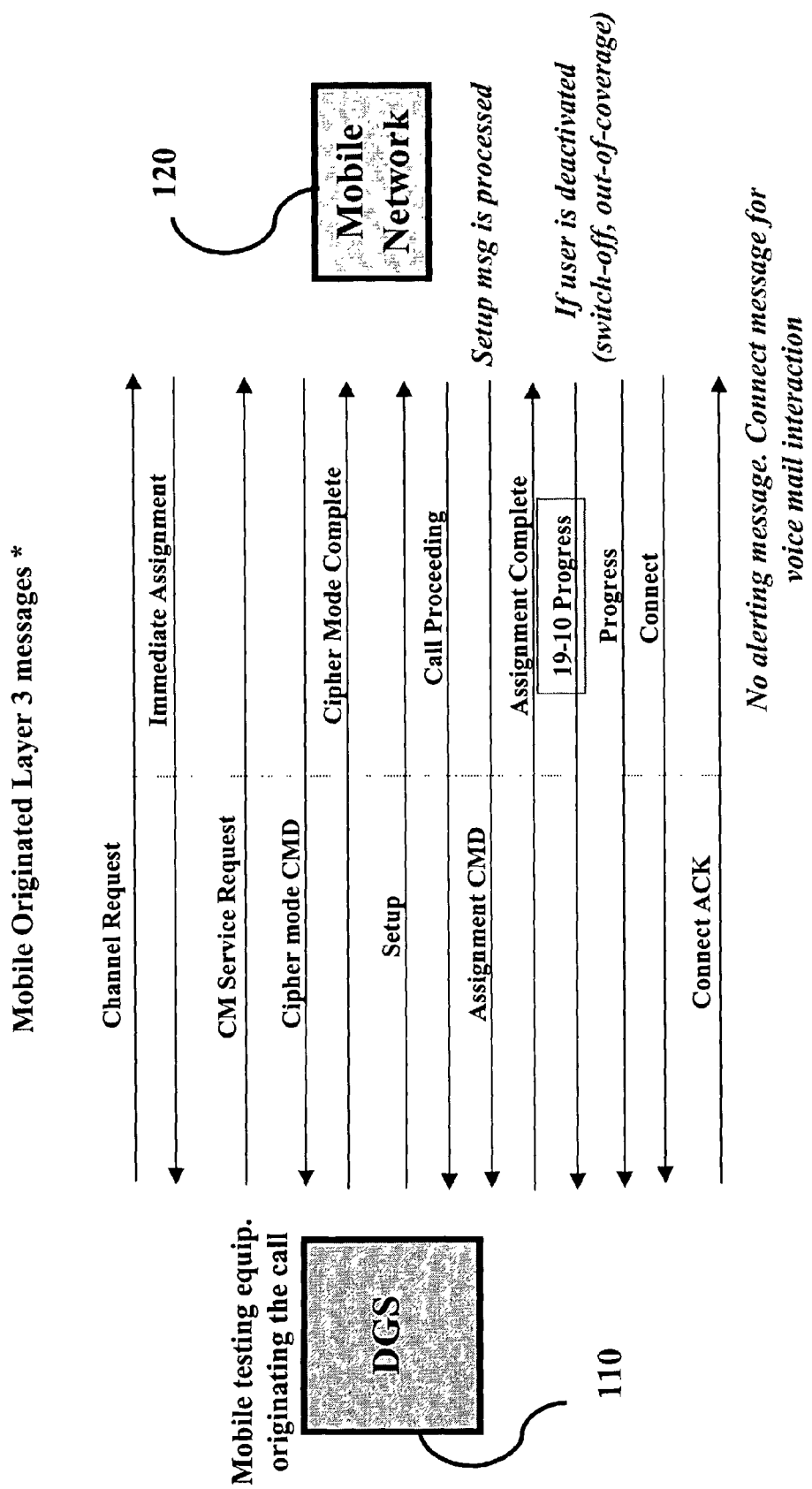
FIG. 19 is an example of the call signaling that one would observe for a GSM network with an MDN assigned to an unreachable subscriber with voicemail.
Figure 20:
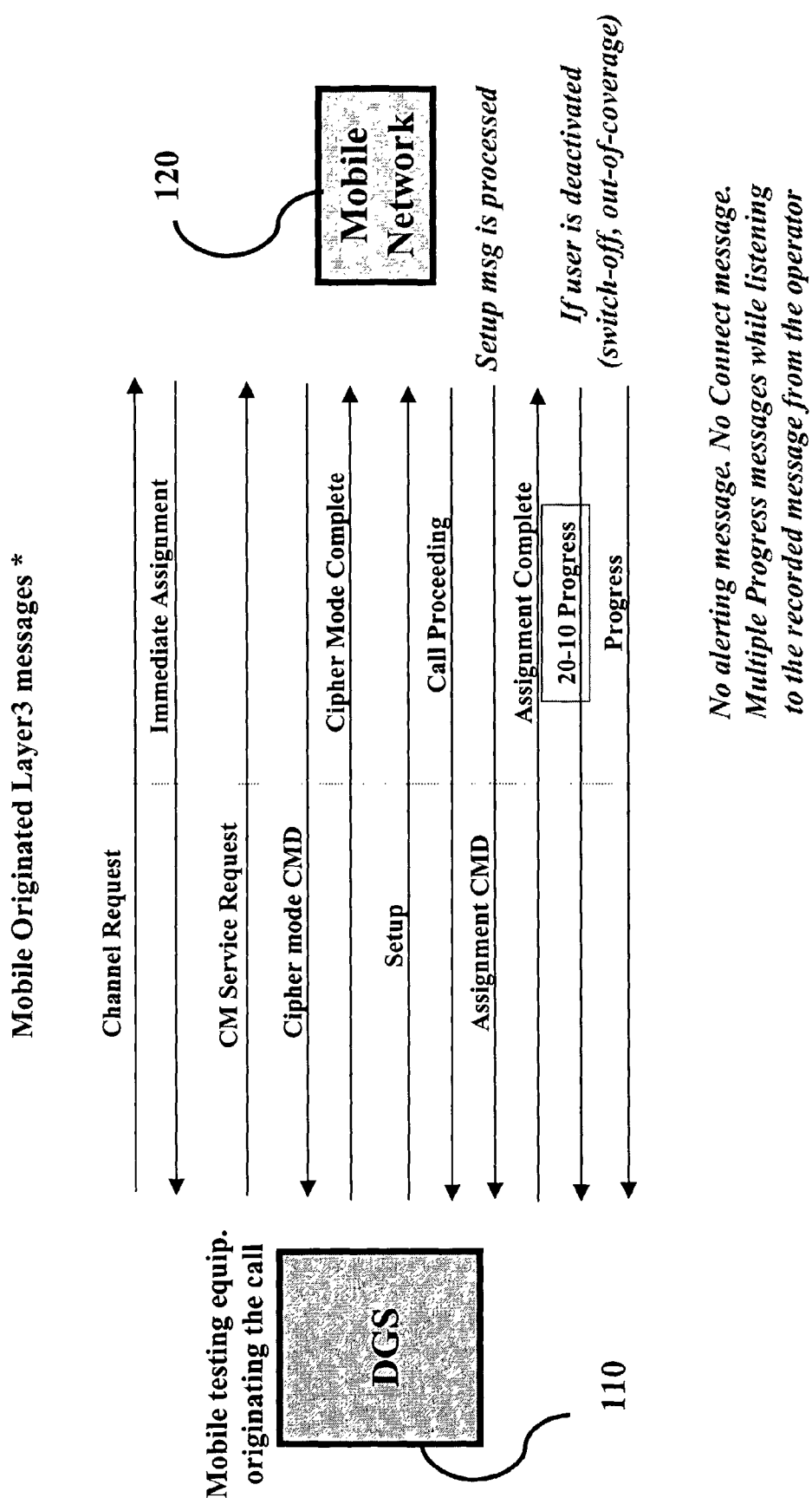
FIG. 20 is an example of the call signaling that one would observe for a GSM network with an MDN assigned to an unreachable subscriber without voicemail.

Based upon the steps outlined in method 1400, there are three possible termination cases, as shown in FIG. 16:

1) The MDN is assigned to a subscriber and the subscriber is currently reachable (16-3). In this case, shown in FIG. 16, the call is initiated (16-1) and will proceed normally (16-3). There should be a detectable Call Proceeding/User Alert message (16-6), which would prove the existence of the subscriber. Upon receipt of the alert, the test equipment terminates the call, prior to any visible incoming call indication appearing on the called mobile device 130.

2) The MDN is unassigned (16-5). In this case, the call setup will fail with a termination message (16-7) that indicates that the subscriber does not exist.

3) The MDN is assigned to a subscriber, but the subscriber is currently unreachable (16-4). In this case, the call will appear to proceed normally, from the perspective of the mobile network, as the call is routed to the appropriate treatment (16-4) for an unreachable subscriber. The call may terminate on a Voice Mail system, a recorded message or a forwarded number. This is clearly distinguishable from the preceding cases by the absence of the Call Proceeding/User Alert or termination message.

In this manner, the present invention provides a system and method for collecting and analyzing market data in a mobile communications system, which may employ one or more of various contact methodologies to contact a selected panel of MDNs, and which may determine the status of the MDNs for analysis to determine various market metrics.

While the foregoing has been with reference to particular embodiments of the invention, it will be appreciated by those skilled in the art that changes in these embodiments may be made without departing from the principles and spirit and scope of the invention.

What is claimed is:

1. A method for collecting and analyzing market data in a mobile communications system comprising:
   selecting a representative sample of mobile directory numbers;
   contacting the sample of mobile directory numbers without dialing the mobile directory numbers by sending messages to be received by mobile communication devices associated with the mobile directory numbers to obtain contact results, including an assigned or unassigned status of the mobile directory numbers, wherein the messages are configured to cause the messages not to be displayed on the mobile communication devices and wherein the messages include a request for a return receipt; and
   analyzing the contact results to determine a measure of market data.

2. The method of claim 1 wherein analyzing the contact results includes clarifying any uncertainty regarding the status of a mobile directory number.

3. The method of claim 2 wherein clarifying any uncertainty comprises re-contacting a mobile directory number to determine the status of the mobile directory number.

4. The method of claim 3 wherein re-contacting a mobile directory number is performed using a different form of contact.

5. The method of claim 1 wherein analyzing the contact results includes allocating a mobile directory number to a specific mobile operator.

6. The method of claim 1 wherein selecting a representative sample of mobile directory numbers includes drawing a random sample of mobile directory numbers allocated to a mobile operator within at least one predetermined market.

7. The method of claim 6 wherein the random sample is tracked over time.

8. The method of claim 6 wherein a new random sample is drawn periodically.

9. The method of claim 1 wherein selecting a representative sample of mobile directory numbers includes obtaining a panel of voluntary participants.

10. The method of claim 1 wherein selecting a representative sample of mobile directory numbers includes updating the representative sample of mobile directory numbers over time as carriers add new blocks of numbers.

11. The method of claim 10 wherein the sample is expanded to include a random draw from a new block of numbers.

12. The method of claim 10 wherein the sample is redrawn and blended over time.

13. The method of claim 10 wherein the sample is partially retired and a new sample is substituted in place.

14. The method of claim 1 further comprising filtering the representative sample of mobile directory numbers prior to contacting the sample.

15. The method of claim 14 wherein filtering the representative sample is performed using data from one or more internal databases.

16. The method of claim 14 wherein filtering the representative sample is performed using data from one or more external databases.

17. The method of claim 1 further comprising actively updating the representative sample of mobile directory numbers over time.

18. The method of claim 17 wherein actively updating the representative sample of mobile directory numbers over time is performed using data from one or more internal databases.

19. The method of claim 17 wherein actively updating the representative sample of mobile directory numbers over time is performed using data from one or more external databases.

20. The method of claim 1 wherein sending the messages includes the use of SMS contact messages.

21. The method of claim 20 wherein sending the messages utilizes at least one mobile communication device to send the SMS contact messages.

22. The method of claim 20 wherein sending the messages utilizes an SMPP protocol to send the SMS contact messages.

23. The method of claim 20 wherein sending the messages utilizes an HTTP protocol to send the SMS contact messages.

24. The method of claim 20 wherein sending the messages utilizes an SMTP protocol to send the SMS contact messages.

25. The method of claim 20 wherein sending the messages utilizes a UCP protocol to send the SMS contact messages.

26. The method of claim 20 wherein sending the messages utilizes header changes to make the SMS contact messages invisible on the mobile communication devices.

27. The method of claim 22 wherein sending the messages utilizes header changes to make the SMS contact messages invisible on the mobile communication devices.

28. The method of claim 1 wherein sending the messages includes the use of voicemail messages.

29. The method of claim 1 wherein sending the messages includes the use of MMS contact messages.

30. The method of claim 1 wherein sending the messages includes the use of WAP contact messages.

31. The method of claim 1 wherein sending the messages includes the use of Instant Messaging contact messages.

32. The method of claim 1 wherein contacting the sample further comprises using a network signaling approach.

33. The method of claim 32 wherein the network signaling approach utilizes SS7 network signaling to query fixed and mobile networks to obtain the status of the mobile directory numbers.

34. The method of claim 32 wherein the network signaling approach utilizes PRI network signaling to query fixed and mobile networks to obtain the status of the mobile directory numbers.

35. The method of claim 32 wherein the network signaling approach is invisible on a mobile communication device.

36. The method of claim 1 wherein contacting the sample further comprises using a call set-up approach.

37. The method of claim 36 wherein the call set-up approach utilizes call set-up and control information communicated to originating mobile communication devices during call processing to obtain the status of the mobile directory numbers.

38. The method of claim 36 wherein the call set-up approach is invisible on a mobile communication device.

39. The method of claim 36 further comprising the step of cross-referencing the representative sample of mobile directory numbers after contacting the sample.

40. The method of claim 39 wherein the step of cross-referencing the representative sample is performed using data from one or more internal databases.

41. The method of claim 40 wherein the data from one or more internal databases includes contact results from a different form of contact.

42. The method of claim 40 wherein the step of cross-referencing the representative sample is performed using data from one or more external databases.

43. The method of claim 1 wherein analyzing the contact results comprises estimating a total number of subscribers for a mobile operator.

44. The method of claim 43 wherein analyzing the contact results comprises estimating a total number of subscribers for a mobile operator within at least one predetermined market.

45. The method of claim 1 wherein analyzing the contact results comprises estimating net subscriber activations for a mobile operator for a predetermined period of time.

46. The method of claim 45 wherein analyzing the contact results comprises estimating net subscriber activations for a mobile operator for a predetermined period of time within at least one predetermined market.

47. The method of claim 1 wherein analyzing the contact results comprises estimating gross additions of subscribers for a mobile operator for a predetermined period of time.

48. The method of claim 47 wherein analyzing the contact results comprises estimating gross additions of subscribers for a mobile operator for a predetermined period of time within at least one predetermined market.

49. The method of claim 1 wherein analyzing the contact results comprises estimating market share for a mobile operator.

50. The method of claim 49 wherein analyzing the contact results comprises estimating market share for a mobile operator within at least one predetermined market.

51. The method of claim 1 wherein analyzing the contact results comprises estimating deactivations of subscribers for a mobile operator for a predetermined period of time.

52. The method of claim 51 wherein analyzing the contact results comprises estimating deactivations of subscribers for a mobile operator for a predetermined period of time within at least one predetermined market.

53. The method of claim 1 wherein analyzing the contact results comprises identifying a mobile operator for a mobile directory number.

54. The method of claim 53 wherein identifying a mobile operator for a mobile directory number is performed by comparing the mobile directory number to a third party database.

55. The method of claim 53 wherein identifying a mobile operator for a mobile directory number is performed by assessing the format of a contact response for the mobile directory number.

56. The method of claim 55 wherein assessing the format of a contact response includes referencing a database for tracking known formats of contact responses of mobile operators to different contact methods.

57. The method of claim 1 wherein analyzing the contact results comprises identifying a geographical region of origin of a mobile directory number.

58. The method of claim 57 wherein identifying a geographical region of origin for a mobile directory number is performed by comparing the mobile directory number to a third party database.

59. The method of claim 57 wherein identifying a geographical region for a mobile directory number is performed by assessing the format of a contact response for the mobile directory number.

60. The method of claim 59 wherein assessing the format of a contact response includes referencing a database for tracking known formats of contact responses of mobile operators in each geographical market to different contact methods.

61. The method of claim 1 wherein analyzing the contact results comprises estimating churn of subscribers for a mobile operator for a predetermined period of time.

62. The method of claim 61 wherein analyzing the contact results comprises estimating churn of subscribers for a mobile operator for a predetermined period of time within at least one predetermined market.

63. A method as defined in claim 1, wherein the messages are configured to cause the messages not to be displayed on the mobile communication device by configuring the messages to be discarded by the mobile communication device.

* * * * *

UNITED STATES PATENT AND TRADEMARK OFFICE
CERTIFICATE OF CORRECTION

| | | |
|---|---|---|
| PATENT NO. | : 8,639,557 B2 | Page 1 of 1 |
| APPLICATION NO. | : 10/237478 | |
| DATED | : January 28, 2014 | |
| INVENTOR(S) | : Tom Frangione et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2398 days.

Signed and Sealed this
Second Day of June, 2015

Michelle K. Lee
*Director of the United States Patent and Trademark Office*